(12) United States Patent (10) Patent No.: US 8,503,044 B2
Wakaura (45) Date of Patent: Aug. 6, 2013

(54) ANGLE DETECTION DEVICE AND IMAGE READING APPARATUS

(75) Inventor: Tomomi Wakaura, Ishikawa (JP)

(73) Assignee: PFU Limited, Ishikawa (JP)

( * ) Notice: Subject to any disclaimer, the term of this patent is extended or adjusted under 35 U.S.C. 154(b) by 464 days.

(21) Appl. No.: 12/883,894

(22) Filed: Sep. 16, 2010

(65) Prior Publication Data

US 2011/0228350 A1 Sep. 22, 2011

(30) Foreign Application Priority Data

Mar. 18, 2010 (JP) ................................. 2010-063233

(51) Int. Cl.
*H04N 1/04* (2006.01)
(52) U.S. Cl.
USPC ........... 358/474; 358/406; 358/504; 356/138; 356/139; 356/139.06
(58) Field of Classification Search
USPC ................. 358/474, 406, 504; 356/138, 139, 356/139.06
See application file for complete search history.

(56) References Cited

U.S. PATENT DOCUMENTS

| 5,029,742 | A | 7/1991 | Theilacker |
| 5,735,785 | A | 4/1998 | Lucas |
| 8,064,111 | B2 | 11/2011 | Kubo |

FOREIGN PATENT DOCUMENTS

| CA | 1129190 A1 | 8/1982 |
| CN | 101309339 A | 11/2008 |
| JP | 57-197422 A | 12/1982 |
| JP | 05-300341 A | 11/1993 |
| JP | 2000-072296 A | 3/2000 |

OTHER PUBLICATIONS

Giichi Ito, Printer, Mar. 7, 2000, JP 2000072296 A.*
Decision of a Patent Grant Application No. 2010-063233 dated Apr. 16, 2013.
Chinese Office Action issued in 201010520816.9 dated May 24, 2013.

* cited by examiner

*Primary Examiner* — Benny Q Tieu
*Assistant Examiner* — Martin Mushambo
(74) *Attorney, Agent, or Firm* — Lowe Hauptman Ham & Berner, LLP

(57) ABSTRACT

An angle detection device includes a rotator including a shaft supported by and inside a case in a direction parallel to a horizontal plane of the case, a center of gravity positioned differently from the shaft, and a diagonal line formed on a surface along a circumferential direction around a rotation axis of the rotator, the line intersecting with a width direction orthogonal to the circumferential direction if the surface is spread into a plane along the circumferential direction; and a sensor including a group of imaging elements arrayed in a line parallel to the shaft direction. The sensor is fixed to and inside the case opposite to the surface. The group intersects with the diagonal line if the surface is viewed from the sensor toward the shaft, and a position of the intersection changes according to rotation of the case around the axis when viewed from the shaft.

5 Claims, 15 Drawing Sheets

FIG.3
(a)
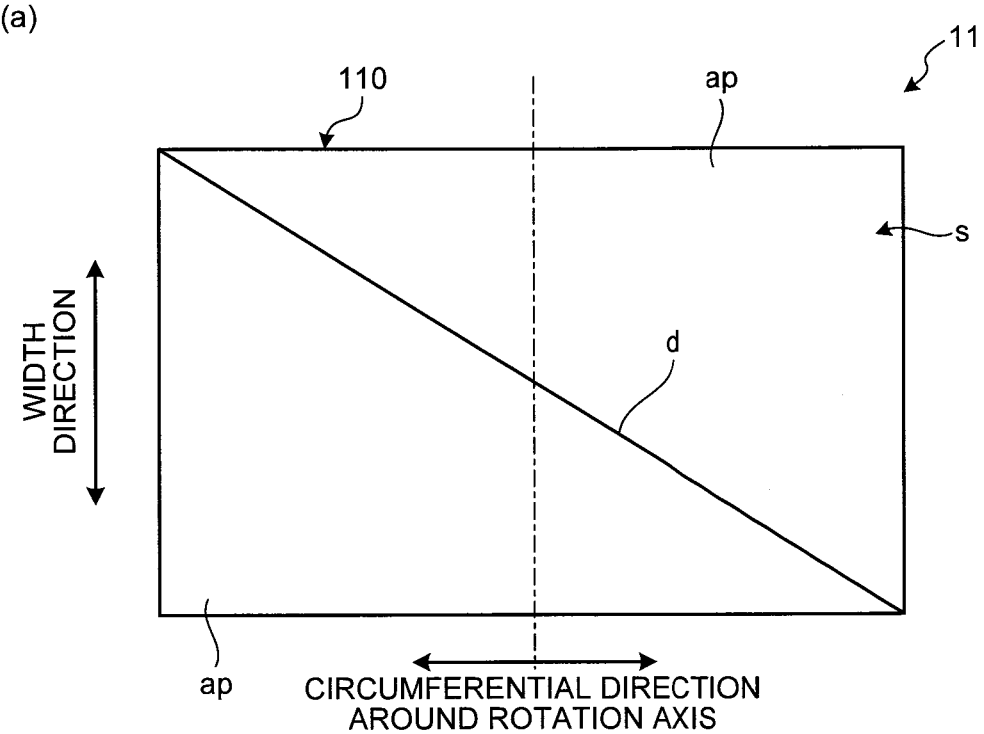
(b)
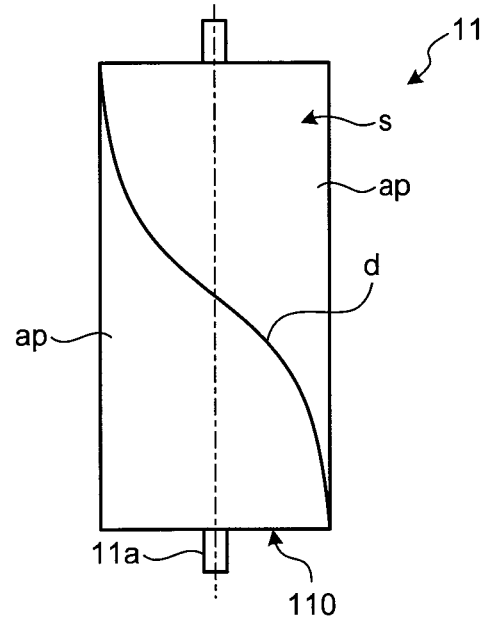

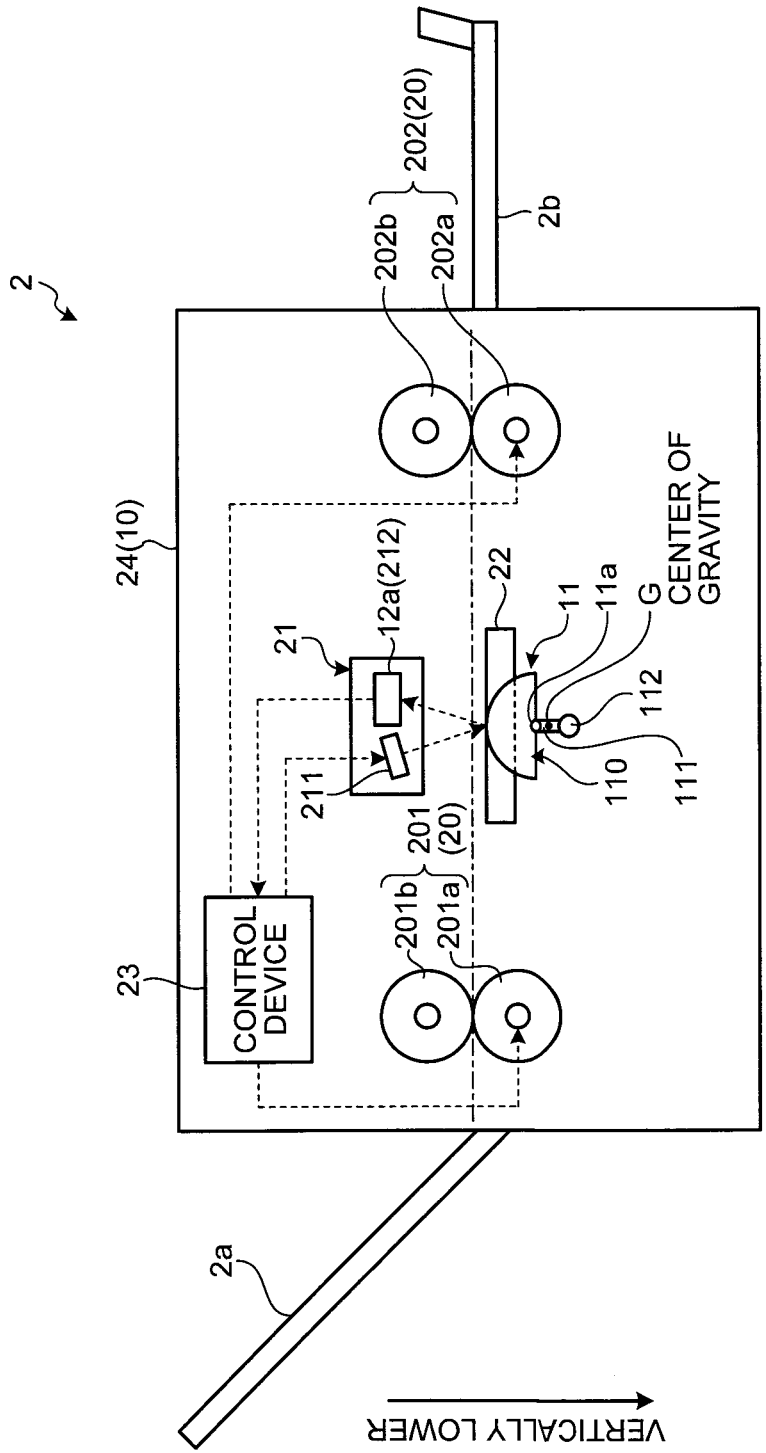

ANGLE DETECTION DEVICE AND IMAGE READING APPARATUS

CROSS-REFERENCE TO RELATED APPLICATIONS

This application is based upon and claims the benefit of priority from Japanese Patent Application No. 2010-063233, filed on Mar. 18, 2010, the entire contents of which are incorporated herein by reference.

BACKGROUND OF THE INVENTION

1. Field of the Invention

The present invention relates to an angle detection device for detecting an inclination angle of an object to be measured with respect to a horizontal plane. The present invention also relates to an image reading apparatus with the angle detection device incorporated therein.

2. Description of the Related Art

Conventionally, image reading apparatuses that pick up an image of a sheet-like medium while conveying the medium have been proposed. In such an image reading apparatus, when a sheet-like medium is inserted in an apparatus body, the medium is conveyed to an imaging device by a conveying roller, imaged by an imaging device, and is ejected from the apparatus body by the conveying roller.

In addition, for example, if the image reading apparatus is compact in size, the apparatus body may be installed in a wall-mounted state or a stationary state. That is, the apparatus body is sometimes installed in an inclined state with respect to the horizontal plane.

As a technology related to the installation of the apparatus body in the inclined state with respect to the horizontal plane, there is proposed an invention in which an installation state of a printer is detected by a posture detection unit and torque of a step motor used for feeding roll paper is controlled according to whether the printer is used in a stationary installation or in a wall-mounted installation (Japanese Patent Application Laid-open No. 2000-72296).

The printer disclosed in Japanese Patent Application Laid-open No. 2000-72296 detects an installation state of the printer by the posture detection unit, and increases the torque of the step motor, if the printer is used in the wall-mounted installation, by reducing a feeding speed of the roll paper as compared with the case where the printer is installed in the stationary state. In other words, the printer in Japanese Patent Application Laid-open No. 2000-72296 detects the installation state of the printer by the posture detection unit, and generates the torque sufficient for feeding the roll paper by reducing the feeding speed of the roll paper, in the case of the installation state such as the wall-mounted installation in which the pull-out load of the roll paper is comparatively high, as compared with the case of the installation state such as the stationary installation in which the pull-out load of the roll paper is comparatively low.

Angle detection devices are generally used to detect an inclination angle of an object to be measured with respect to the horizontal plane. Such an angle detection device includes a rotary encoder or a conventionally known angle sensor such as an angular velocity sensor, but a sensor with a new configuration is desired.

SUMMARY OF THE INVENTION

It is an object of the present invention to at least partially solve the problems in the conventional technology.

According to an aspect of the present invention, an angle detection device includes: (1) a horizontal axis rotator including: a rotating shaft supported by a case member inside the case member in a rotating shaft direction parallel to a horizontal plane of the case member; a center of gravity at a position different from a position of the rotating shaft; and a diagonal line formed on an outer circumferential surface of the horizontal axis rotator, the outer circumferential surface being a circumferential surface formed along a circumferential direction around a rotation axis of the horizontal axis rotator, the diagonal line intersecting with a width direction that is a direction orthogonal to the circumferential direction around the rotation axis if the outer circumferential surface is spread into a plane along the circumferential direction around the rotation axis; and (2) an imaging sensor including an imaging element group that is a plurality of imaging elements arrayed in at least one line in an array direction that is a direction in which the plurality of imaging elements are arrayed, the array direction being parallel to the rotating shaft direction, the imaging sensor being fixed to the case member opposite to the outer circumferential surface inside the case member, wherein the imaging element group intersects with the diagonal line if the outer circumferential surface is viewed from the imaging sensor toward the rotating shaft, and an intersection position that is a position of the intersection changes according to rotation of the case member around the rotation axis when viewed from the rotating shaft.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 3 is a diagram of an outline of an outer circumferential surface of a diagonal-line formed portion;

FIG. 12 is a side view of an outline of an image reading apparatus according to a second embodiment;

DETAILED DESCRIPTION OF THE PREFERRED EMBODIMENTS

Embodiments of an angle detection device and an image reading apparatus according to the present invention will be explained in detail below with reference to the accompanying drawings. It should be noted that the present invention is not limited by the following embodiments.

Figure 1:
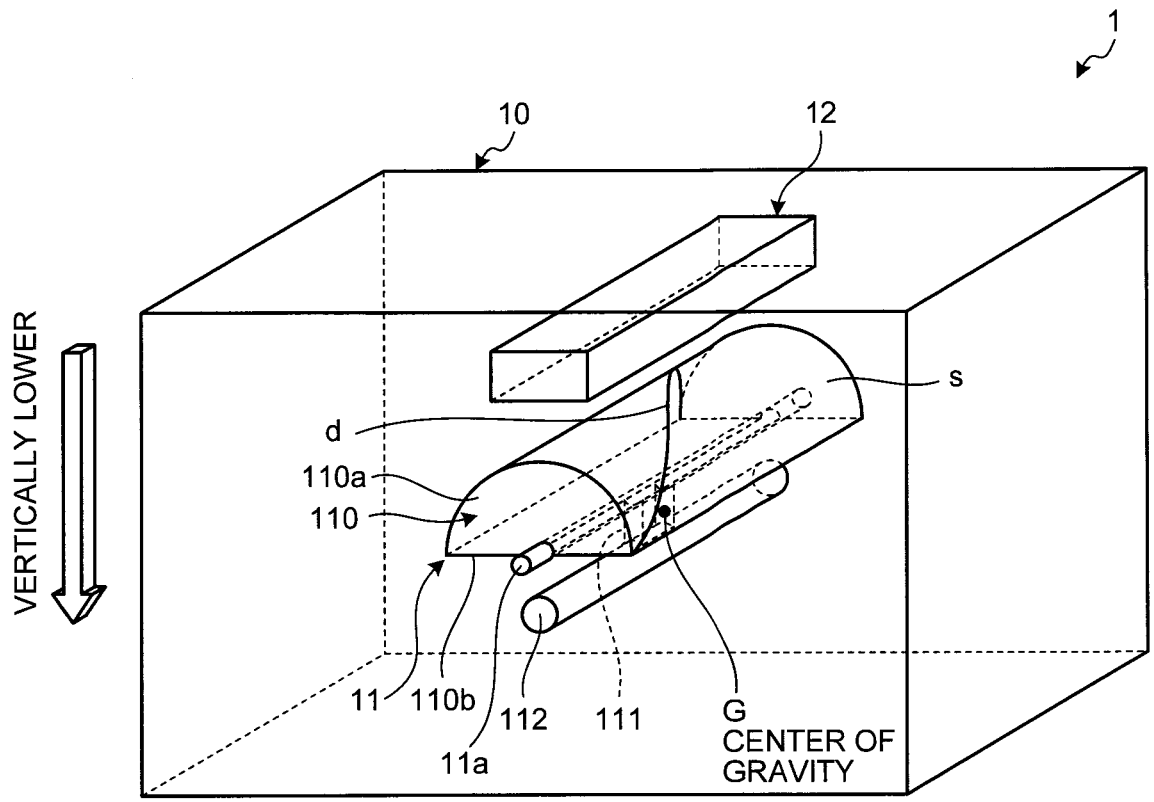
FIG. 1 is a perspective view of an outline of an angle detection device according to a first embodiment.
Figure 2:
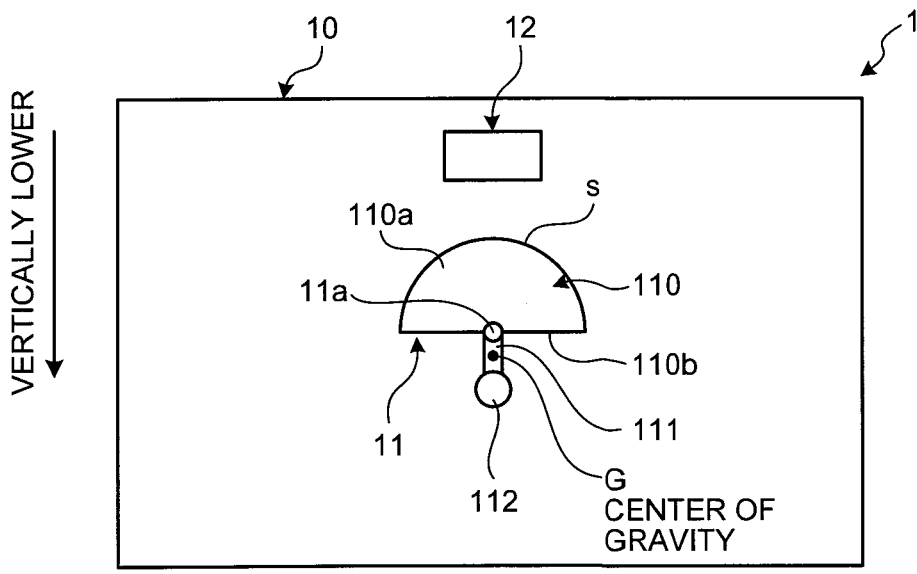
FIG. 2 is a side view of the outline of the angle detection device.

An angle detection device according to a first embodiment will be explained below. FIG. 1 is a perspective view of an outline of the angle detection device according to the first embodiment. FIG. 2 is a side view of the outline of the angle detection device. An angle detection device 1 detects an inclination angle of an object to be measured with respect to the horizontal plane. The angle detection device 1 includes a case member 10, a horizontal axis rotator 11, and an imaging sensor 12.

The case member 10 is the object to be measured. The case member 10 houses at least the horizontal axis rotator 11 and the imaging sensor 12, and is formed into, for example, a rectangular box. In the first embodiment, the case member 10 houses the horizontal axis rotator 11 and the imaging sensor 12.

The horizontal axis rotator 11 is used to detect an inclination angle of the case member 10 with respect to the horizontal plane. The horizontal axis rotator 11 is disposed inside the case member 10. The horizontal axis rotator 11 includes a rotating shaft 11a, a rotating shaft direction thereof is parallel to the horizontal plane of the case member 10, and the rotating shaft 11a is supported by the case member 10. The horizontal axis rotator 11 is configured so that at least one of the shape thereof and the density of a material used therefor is not point-symmetrical to a position of the rotating shaft when viewed from the rotating shaft direction, and this causes a position of the center of gravity to be different from the position of the rotating shaft. A letter "G" in FIGS. 1 and 2 represents the center of gravity of the horizontal axis rotator 11.

The horizontal axis rotator 11 has a diagonal line "d" formed along an outer circumferential surface "s" thereof. The outer circumferential surface "s" mentioned here is a circumferential surface formed along a circumferential direction around a rotation axis of the horizontal axis rotator 11. The diagonal line "d" mentioned here represents a segment that intersects with a width direction being a direction orthogonal to the circumferential direction around the rotation axis of the horizontal axis rotator 11 in a state in which the outer circumferential surface "s" of the horizontal axis rotator 11 is spread into a plane along the circumferential direction around the rotation axis of the horizontal axis rotator 11. However, the diagonal line "d" excludes those orthogonal to the width direction. The diagonal line "d" is a segment extending along a direction that intersects with both the circumferential direction around the rotation axis and the width direction in the state in which the outer circumferential surface "s" of the horizontal axis rotator 11 is spread into the plane along the circumferential direction around the rotation axis of the horizontal axis rotator 11. Hereinafter, the state in which the outer circumferential surface "s" of the horizontal axis rotator 11 is spread into the plane along the circumferential direction around the rotation axis of the horizontal axis rotator 11 is called "plane spread state".

Here, one example of the horizontal axis rotator 11 will be explained below. The horizontal axis rotator 11 according to the first embodiment includes the rotating shaft 11a, a diagonal-line formed portion 110, an arm portion 111, and a weight portion 112.

The diagonal-line formed portion 110 is a semicircular cylinder in the first embodiment. The diagonal-line formed portion 110 includes a bottom face 110a, a horizontal plane portion 110b, and the outer circumferential surface "s". The bottom face 110a is a semicircular plane of the diagonal-line formed portion 110. The bottom face 110a is provided vertically with respect to the horizontal plane of the case member 10. The horizontal plane portion 110b is a plane other than the bottom face 110a of the diagonal-line formed portion 110, or is a rectangular plane. The horizontal plane portion 110b is provided parallel to the horizontal plane of the case member 10 by the weight portion 112 explained later. The outer circumferential surface "s" is a circumferential surface portion of the diagonal-line formed portion 110.

In the diagonal-line formed portion 110, the rotating shaft 11a is provided in a position being a center of curvature of a circular arc portion in the bottom face 110a and a semicircular cross section being a cross section of the diagonal-line formed portion 110 parallel to the bottom face 110a. The rotating shaft 11a is protruded, from the bottom faces 110a, toward a side opposite to a middle portion of the horizontal plane portion 110b in the shaft direction, and the protruded portions are supported by the case member 10. The rotating shaft 11a is provided in the position being the center of curvature of the circular arc portion in the bottom faces 110a and the semicircular cross section, and thus, even if the diagonal-line formed portion 110 and the imaging sensor 12 explained later are caused to relatively rotate around the rotation axis of the horizontal axis rotator 11, a distance between the outer circumferential surface "s" of the diagonal-line formed portion 110 and the imaging sensor 12 are kept constant.

FIG. 3 is a diagram of an outline of the outer circumferential surface of the diagonal-line formed portion. In FIG. 3, (a) is a diagram representing a plane spread state of the outer circumferential surface "s" of the diagonal-line formed portion 110, and (b) is a top view of the outer circumferential surface "s" of the diagonal-line formed portion 110. As depicted in (a) of FIG. 3, in the plane spread state of the outer circumferential surface "s", the diagonal line "d" is a diagonal. As depicted in (a) and (b) of FIG. 3, the diagonal line "d" is formed in a non-formed area being a portion of the outer circumferential surface "s" where the diagonal line "d" is not formed, and is formed by, for example, arranging a different color, making a density of an arranged color different, or providing irregularities such as a groove and a protrusion. As for the diagonal line "d" as formed in the above manner, a center point being a point located at the center of the diagonal line "d" is located on the vertically upper side of the rotating shaft 11a by the weight portion 112.

The arm portion 111 connects the diagonal-line formed portion 110 and the weight portion 112. The arm portion 111 is formed into a rectangular-column in the first embodiment. The arm portion 111 is disposed at the central portion of the horizontal plane portion 110b in the first embodiment. The arm portion 111 is vertically provided with respect to the horizontal plane portion 110b. The arm portion 111 is integrally formed with the horizontal plane portion 110b. Thus, when the case member 10 and the horizontal axis rotator 11 are relatively rotated against each other, the arm portion 111 and the diagonal-line formed portion 110 as a unit are relatively rotated against the case member 10.

The weight portion 112 is used to maintain the posture of the horizontal axis rotator 11 to the posture before the relative rotation even if the case member 10 and the horizontal axis rotator 11 relatively rotate around the rotation axis of the horizontal axis rotator 11. The weight portion 112 is formed into a cylinder in the first embodiment, and its shaft direction is parallel to the rotating shaft 11a. The middle portion in a shaft direction of the weight portion 112 on the circumferential surface is connected with a portion of the arm portion 111 opposite to the diagonal-line formed portion 110. The weight portion 112 is integrally formed with the arm portion 111, and thus, when the case member 10 and the horizontal axis rotator 11 are relatively rotated against each other, the diagonal-line formed portion 110 and the arm portion 111 as a unit are relatively rotated against the case member 10. The weight portion 112 is set to have a large mass with respect to the diagonal-line formed portion 110. Because of this, the position of the center of gravity of the horizontal axis rotator 11 is set to the opposite side to the outer circumferential surface "s" with respect to the horizontal plane portion 110b. In the first embodiment, the position of the center of gravity of the horizontal axis rotator 11 is set between the rotating shaft 11a and the weight portion 112 or on the arm portion 111. Therefore, the weight portion 112 maintains the posture of the horizontal axis rotator 11 to a posture in which the weight portion 112 is located on the vertically lower side of the rotating shaft 11a regardless of whether the case member 10 and the horizontal axis rotator 11 relatively rotate.

Here, the weight portion 112 is located on the vertically lower side of the rotating shaft 11a and the arm portion 111 is vertically provided with respect to the horizontal plane portion 110b, which causes the horizontal plane portion 110b to be maintained in a state parallel to the horizontal plane of the case member 10. In other words, the horizontal plane portion 110b is maintained by the weight portion 112 in a state parallel to the horizontal plane of the case member 10. Furthermore, because of this, the center point of the diagonal line "d" on the outer circumferential surface "s" is located on the vertically upper side of the rotating shaft 11a. In other words, a state in which the center point of the diagonal line "d" on the outer circumferential surface "s" is located on a "vertical plane with respect to the horizontal" is maintained. The vertical plane with respect to the horizontal mentioned here represents a plane including the rotating shaft 11a and vertical with respect to the horizontal plane of the case member 10.

Therefore, in the angle detection device 1, when the outer circumferential surface "s" of the diagonal-line formed portion 110 is viewed from the imaging sensor 12 toward the rotating shaft 11a, an intersection position being a position, where an imaging element group 12a explained later and the diagonal line d intersect, changes according to rotation of the case member 10 around the rotation axis when viewed from the rotating shaft 11a.

Figure 4:
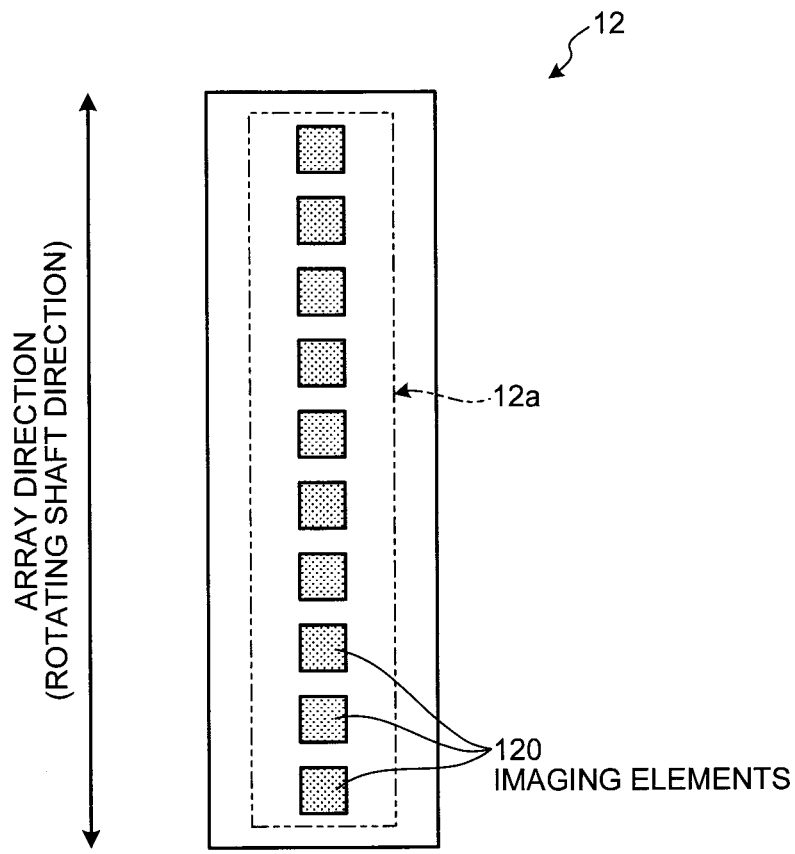
FIG. 4 is a bottom view of an outline of an imaging sensor.

The imaging sensor 12 picks up an image of the diagonal line "d" formed on the outer circumferential surface "s" of the horizontal axis rotator 11. FIG. 4 is a bottom view of an outline of the imaging sensor. As depicted in FIG. 4, the imaging sensor 12 includes the imaging element group 12a. The imaging element group 12a is a plurality of imaging elements 120 arrayed in at least one line. In the first embodiment, the imaging elements 120 are arrayed in a line. The imaging sensor 12 is disposed inside the case member 10. The imaging sensor 12 is configured so that an array direction of the imaging elements 120 is parallel to the rotating shaft direction of the horizontal axis rotator 11, and is opposed to the outer circumferential surface "s" of the diagonal-line formed portion 110 and is fixed to the case member 10. The array direction mentioned here represents a direction in which the imaging elements 120 are arrayed in the at least one line.

The imaging element group 12a intersects with the diagonal line "d" when the outer circumferential surface "s" of the diagonal-line formed portion 110 is viewed from the imaging sensor 12 toward the rotating shaft 11a. At least one of the imaging elements 120 provided in the imaging sensor 12 is in a standby state for imaging the diagonal line "d". In the first embodiment, the imaging element group 12a is located on the vertical plane with respect to the horizontal while the case member 10 is kept in the horizontal plane. In the first embodiment, an image of the center point of the diagonal line "d" is picked up by the imaging element 120 located at the center of the array direction or by an imaging element 120 nearest to the center of the array direction, among the imaging elements 120, while the case member 10 is kept in the horizontal plane.

When an image of the outer circumferential surface "s" of the diagonal-line formed portion 110 is picked up by the imaging sensor 12, light from the outer circumferential surface "s" of the diagonal-line formed portion 110 is incident on the imaging elements 120 of the imaging sensor 12. Therefore, a picked-up image signal for each exposure corresponding to a read area is output from each of the imaging elements 120 of the imaging sensor 12. The imaging sensor 12 generates line data for each main scanning direction from the picked up image signal for each exposure output from each of the imaging elements 120 and outputs the line data.

In order to pick up an image of the outer circumferential surface "s" of the diagonal-line formed portion 110 by the imaging sensor 12, for example, a light source is simply provided near the imaging sensor 12. The light source is, for example, an LED, which diffuses an emitted light by a light guide plate and emits a linear light toward the outer circumferential surface "s" of the horizontal axis rotator 11 in the rotating shaft direction of the horizontal axis rotator 11. Therefore, the LED is turned on according to a turn-on instruction from a control device 1c explained later. In addition, in order to pick up an image of the outer circumferential surface "s" of the diagonal-line formed portion 110 by the imaging sensor 12, for example, outside light may be taken into the case member 10 and reflected by the outer circumferential surface "s" of the horizontal axis rotator 11. In these cases, a reflected light being a light reflected by the outer circumferential surface "s" of the diagonal-line formed portion 110 is caused to enter the imaging elements 120 of the imaging sensor 12.

Moreover, in order to pick up an image of the outer circumferential surface "s" of the diagonal-line formed portion 110 by the imaging sensor 12, for example, light may be irradiated from the outer circumferential surface "s" by emission of light from the diagonal-line formed portion 110, and the illumination may be performed according to a turn-on instruction from the control device 1c.

The angle detection device 1 as explained above operates based on an angle-detection start signal received from the control device 1c.

Figure 5:
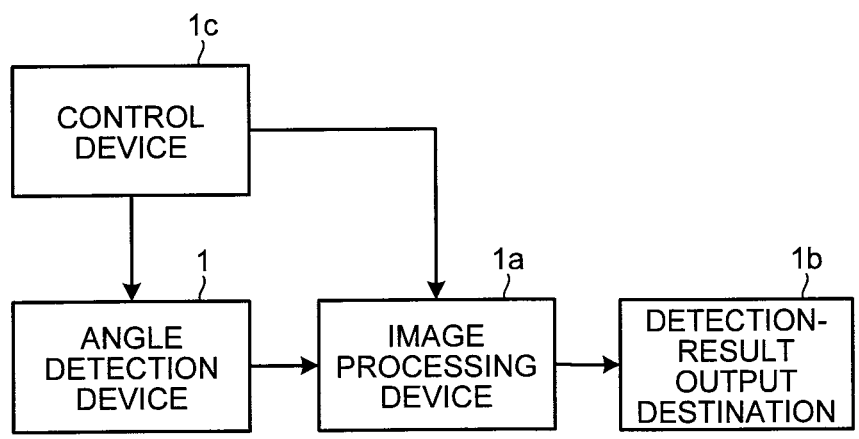
FIG. 5 is a block diagram of a mode of use of the angle detection device.

FIG. 5 is a block diagram of a mode of use of the angle detection device. In the angle detection device 1, the imaging sensor 12 is connected to an image processing device 1a. The image processing device 1a extracts a portion having a locally different density from a linear picked-up image of the outer circumferential surface "s" of the diagonal-line formed portion 110 by the imaging sensor 12 in the width direction of the outer circumferential surface "s", based on the line data output from the imaging sensor 12 of the angle detection device 1. More specifically, the image processing device 1a detects a place where the image of the diagonal line "d" is picked up in the width direction of the outer circumferential surface "s" from the linear picked-up image of the outer circumferential surface "s" of the diagonal-line formed portion 110 by the imaging sensor 12, based on the line data output from the imaging sensor 12 of the angle detection device 1. Then, the image processing device 1a determines an inclination angle of the case member 10 with respect to the horizontal plane, from the detected imaged portion of the diagonal line "d" in the width direction of the outer circumferential surface "s". The image processing device 1a may determine an inclination angle of the case member 10 with respect to the horizontal plane through computation for each imaging of the outer circumferential surface "s" by the imaging sensor 12. Moreover, the image processing device 1a may determine an inclination angle of the case member 10 with respect to the horizontal plane by referring to a map, for example, an LUT (look up table), in which a correlation between an image-picked-up portion of the diagonal line "d" detected by the imaging sensor 12 in the width direction of the outer circumferential surface "s" and an inclination angle of the case member 10 with respect to the horizontal plane is previously stored. The inclination angle of the case member 10 with respect to the horizontal plane determined by the image processing device 1a is output to a detection-result output destination 1b. The image processing device 1a operates based on an image processing signal received from the control device 1c.

Furthermore, the imaging sensor 12 of the angle detection device 1 is connected to the control device 1c. In other words, the control device 1c controls the angle detection device 1 and the image processing device 1a.

Next, the operation of the angle detection device 1 according to the first embodiment will be explained below.

First, the control device 1c causes the imaging sensor 12 of the angle detection device 1 to pick up an image of the diagonal line "d". The control device 1c, when outputting an angle-detection start signal to the angle detection device 1, causes the imaging sensor 12 of the angle detection device 1 to start imaging a linear imaging area of the diagonal-line formed portion 110. When the outer circumferential surface "s" of the diagonal-line formed portion 110 is viewed from the imaging sensor 12 toward the rotating shaft position of the horizontal axis rotator 11, an intersection position between the imaging element group 12a and the diagonal line "d" is a center position of the imaging elements 120 in the array direction of the imaging elements 120 while the case member 10 is kept in the horizontal. The intersection position between the imaging element group 12a and the diagonal line "d" shifts to one side of the array direction from the center position of the imaging elements 120 according to the inclination angle of the case member 10 with respect to the horizontal plane when the case member 10 is inclined from this state to one side of the circumferential direction around the rotation axis of horizontal axis rotator 11. When the case member 10 is inclined to the other side, the intersection position shifts to the other side of the array direction from the center position of the imaging elements 120.

When causing the imaging sensor 12 of the angle detection device 1 to pick up an image of the diagonal line "d", the control device 1c causes the imaging sensor 12 to output the detection result of the imaging sensor 12 to the detection-result output destination 1b through the image processing device 1a. If the inclination angle of the case member 10 with respect to the horizontal plane is not 0 degree, the intersection position between the imaging element group 12a and the diagonal line "d" shifts along the array direction from the center position of the imaging elements 120, which causes the pattern of the imaging element 120 that detects the diagonal line "d" among the imaging elements 120 to become different. More specifically, if the inclination angle of the case member 10 with respect to the horizontal plane is not 0 degree, the intersection position between the imaging element group 12a and the diagonal line "d" shifts along the array direction from the center position of the imaging elements 120, and thus if the diagonal line "d" is detected by one imaging element 120, the position of the imaging element 120 that has detected the diagonal line "d" becomes different or if the diagonal line "d" is detected by a plurality of imaging elements 120, then a combination thereof becomes different. Therefore, the line data, being the output result of the imaging sensor 12, corresponding to the linear picked-up image for the outer circumferential surface "s" of the diagonal-line formed portion 110 becomes different according to the inclination angle of the case member 10 with respect to the horizontal plane. In short, the angle detection device 1 is able to detect the inclination angle of the case member 10 with respect to the horizontal plane.

Next, a specific operation of the angle detection device 1 will be explained below by exemplifying a case where five imaging elements 120 are provided in the imaging sensor 12. Hereinafter, for convenience of explanation, five imaging elements 120 such as imaging elements 120a, 120b, 120c, 120d, and 120e are assumed to be successively arrayed along the array direction at equal intervals.

Figure 6A:
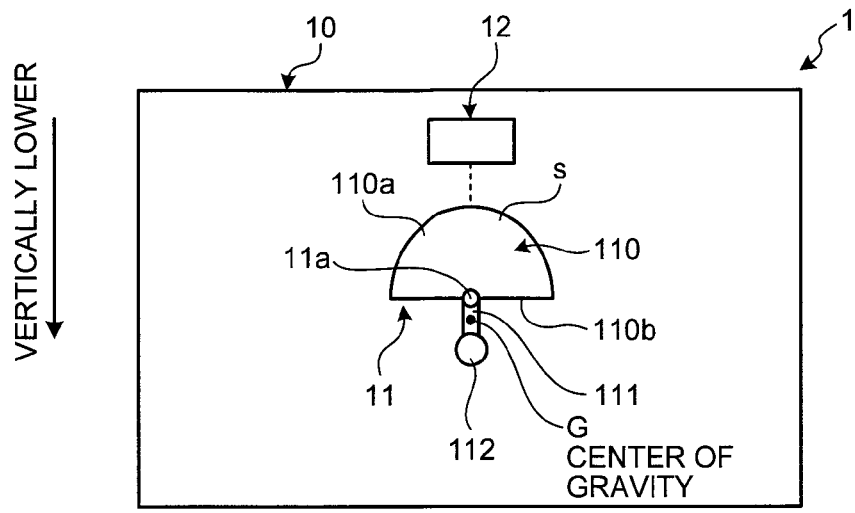
FIGS. 6A to 6C are explanatory diagrams of a case in which an inclination angle is 0 degree.
Figure 6B:
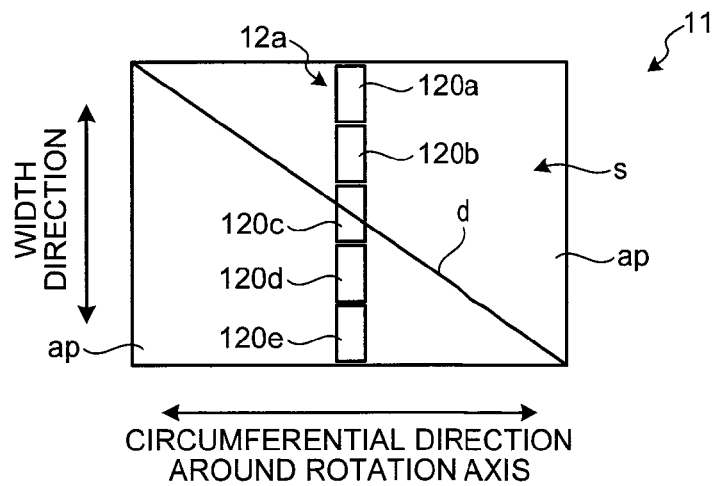
Figure 6C:
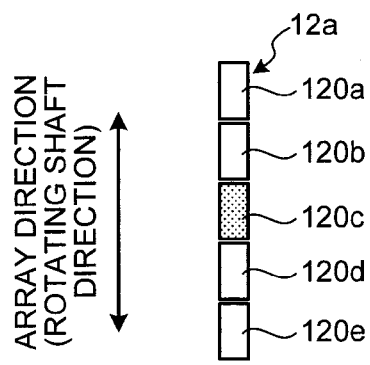

FIGS. 6A to 6C are explanatory diagrams of a case in which an inclination angle is 0 degree. Hereinafter, in the first embodiment, an inclination angle of the case member 10 with respect to the horizontal plane is a positive angle when the case member 10 rotates clockwise on the plane of paper, and a negative angle when the case member 10 rotates counterclockwise on the plane of paper. As depicted in FIGS. 6A to 6C, when the inclination angle of the case member 10 with respect to the horizontal plane is 0 degree, the center point of the diagonal line "d" and the imaging element group 12a are located on the vertical plane with respect to the horizontal. An image of the diagonal line "d" in the linear imaging area is picked up by the imaging element 120c which is located at the center of the array direction. A non-formed area "ap" in the linear imaging area is imaged up by the imaging elements 120a, 120b, 120d, and 120e. The line data becomes, for example, "11011" from output signals from the imaging elements 120a, 120b, 120c, 120d, and 120e.

Figure 7A:
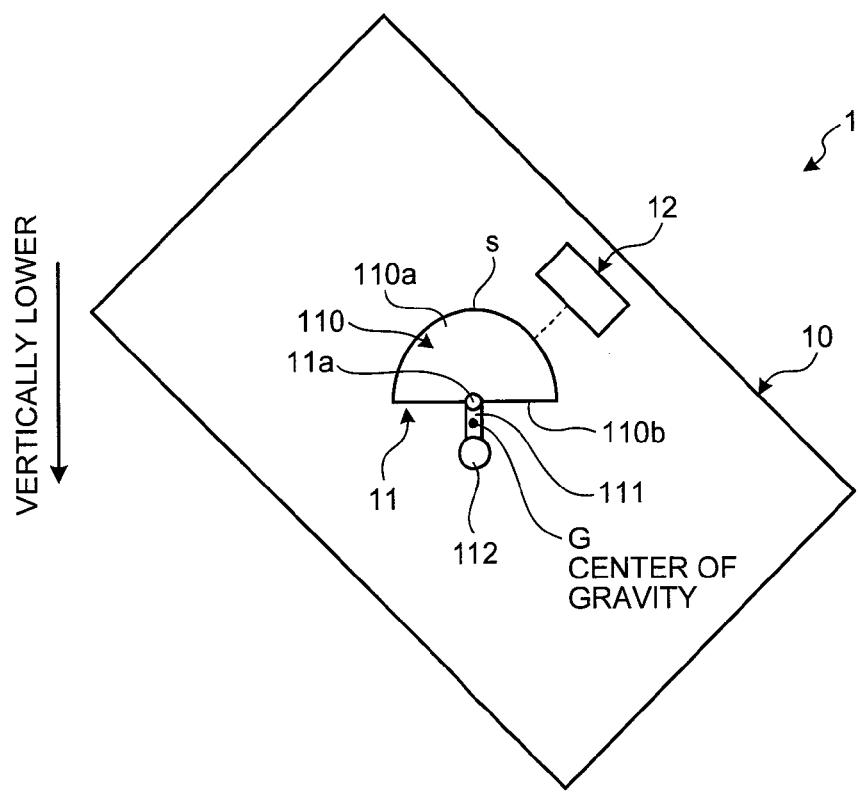
FIGS. 7A to 7C are explanatory diagrams of a case in which the inclination angle is 45 degrees.
Figure 7B:
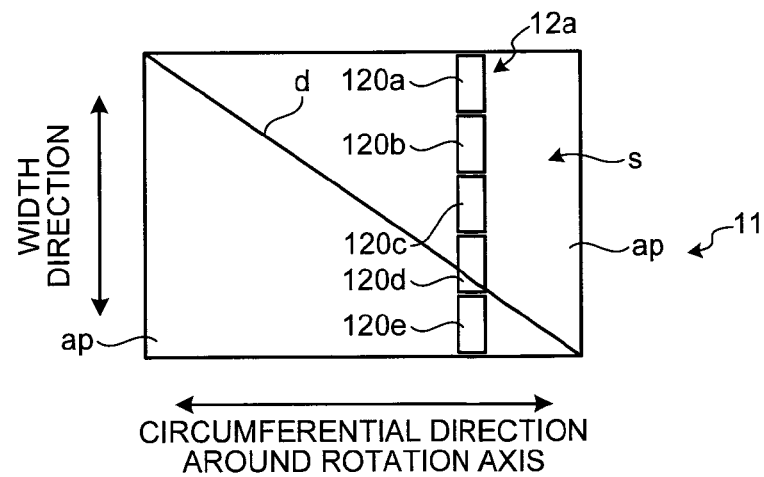
Figure 7C:
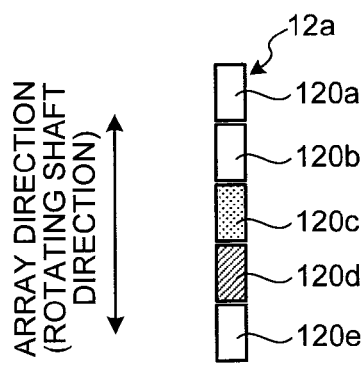

FIGS. 7A to 7C are explanatory diagrams of a case in which the inclination angle is 45 degrees. As depicted in FIGS. 7A to 7C, when the inclination angle of the case member 10 with respect to the horizontal plane is 45 degrees, the imaging element group 12a moves clockwise on the basis of the vertical plane with respect to the horizontal. As depicted in FIGS. 7B and 7C, the diagonal line "d" in the linear imaging area is imaged by the imaging element 120d located at a position shifted by one imaging element from the imaging element 120c at the center of the array direction. The non-formed area "ap" in the linear imaging area is imaged by the imaging elements 120a, 120b, 120c, and 120e. The line data becomes, for example, "11101" from output signals from the imaging elements 120a, 120b, 120c, 120d, and 120e.

Figure 8A:
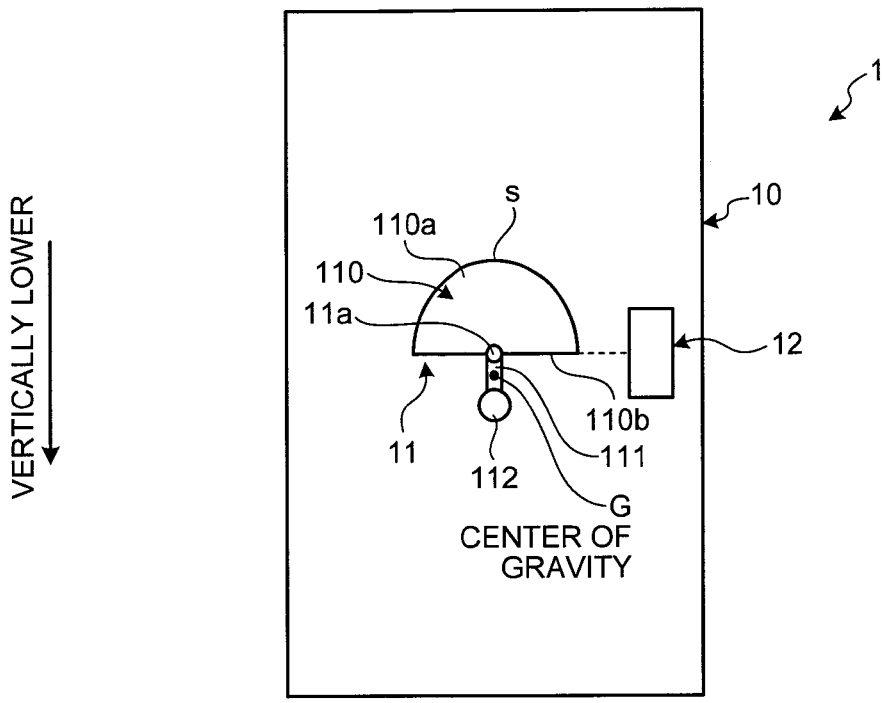
FIGS. 8A to 8C are explanatory diagrams of a case in which the inclination angle is 90 degrees.
Figure 8B:
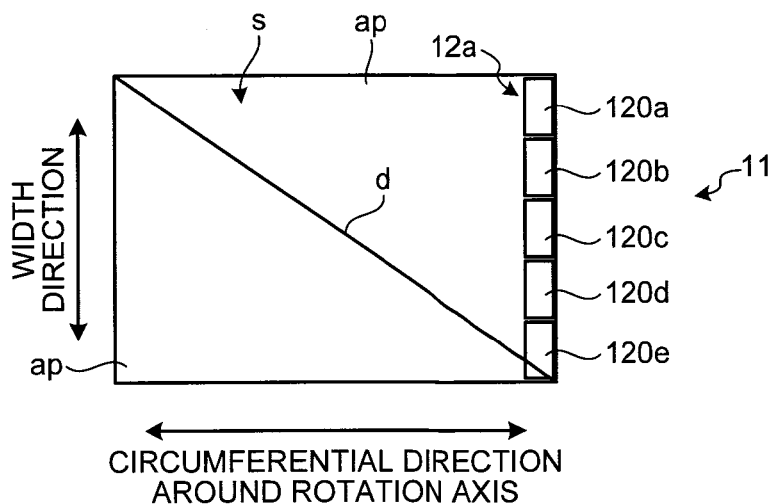
Figure 8C:
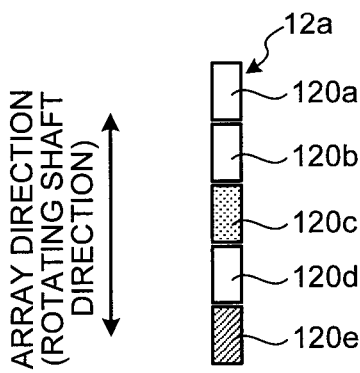

FIGS. 8A to 8C are explanatory diagrams of a case in which the inclination angle is 90 degrees. As depicted in FIGS. 8A to 8C, when the inclination angle of the case member 10 with respect to the horizontal plane is 90 degrees, the imaging element group 12a further moves clockwise on the basis of the vertical plane with respect to the horizontal as compared with the case where the inclination angle of the case member 10 with respect to the horizontal plane is 45 degrees. As depicted in FIGS. 8B and 8C, the diagonal line "d" in the linear imaging area is imaged by the imaging element 120e located at a position shifted by two imaging elements from the imaging element 120c at the center of the array direction. The non-formed area "ap" in the linear imaging area is imaged by the imaging elements 120a, 120b, 120c, and 120d. The line data becomes, for example, "11110" from output signals from the imaging elements 120a, 120b, 120c, 120d, and 120e.

Figure 9A:
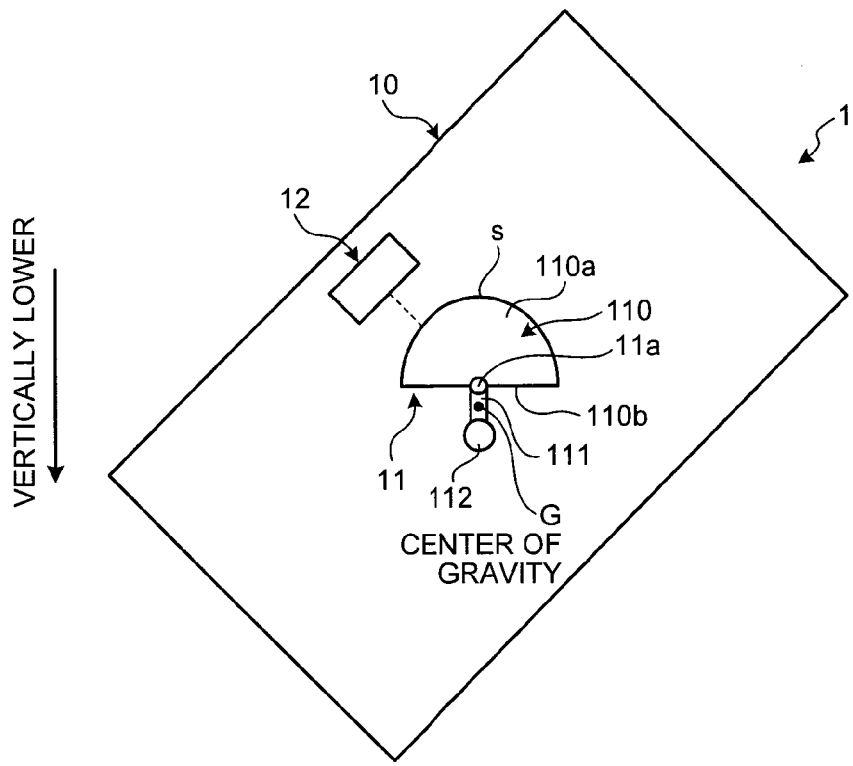
FIGS. 9A to 9C are explanatory diagrams of a case in which the inclination angle is −45 degrees.
Figure 9B:
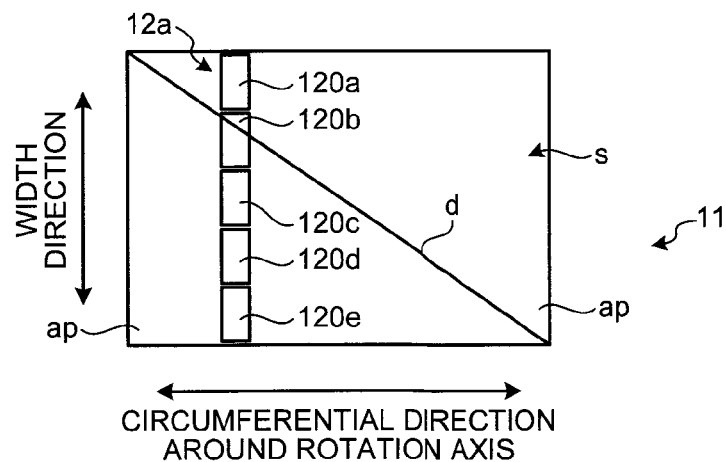
Figure 9C:
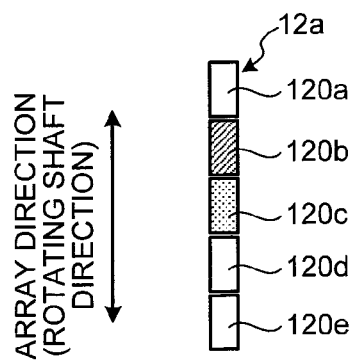

FIGS. 9A to 9C are explanatory diagrams of a case in which the inclination angle is −45 degrees. As depicted in FIGS. 9A to 9C, when the inclination angle of the case member 10 with respect to the horizontal plane is −45 degrees, the imaging element group 12a moves counterclockwise on the basis of the vertical plane with respect to the horizontal. As depicted in FIGS. 9B and 9C, the diagonal line "d" in the linear imaging area is imaged by the imaging element 120b located at a position shifted by one imaging element from the imaging element 120c at the center of the array direction. The non-formed area "ap" in the linear imaging area is imaged by the imaging elements 120a, 120c, 120d, and 120e. The line data becomes, for example, "10111" from output signals from the imaging elements 120a, 120b, 120c, 120d, and 120e.

Figure 10A:
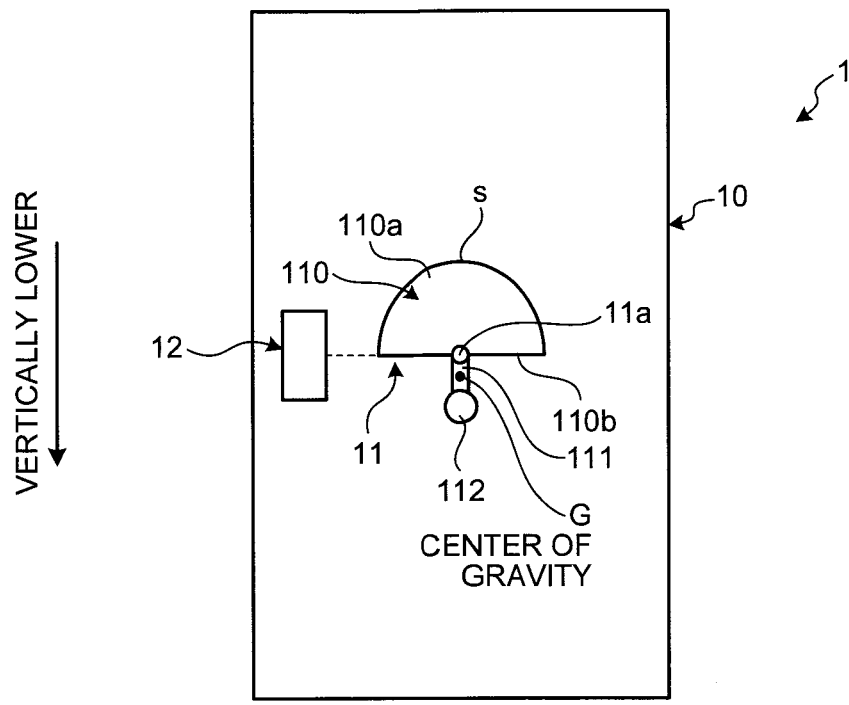
FIGS. 10A to 10C are explanatory diagrams of a case in which the inclination angle is −90 degrees.
Figure 10B:
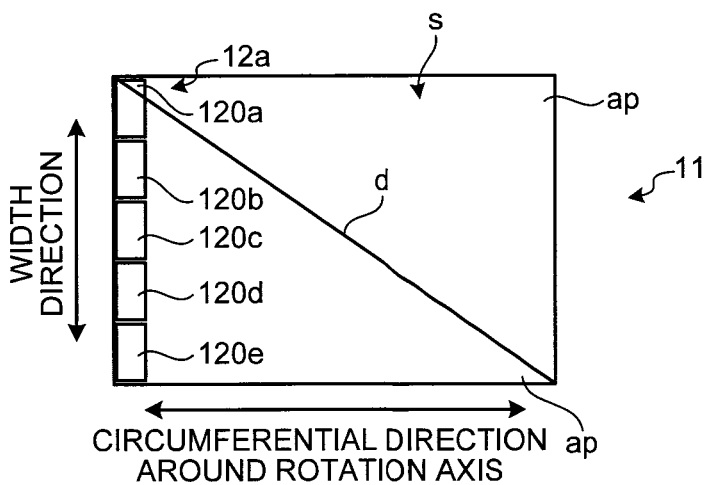
Figure 10C:
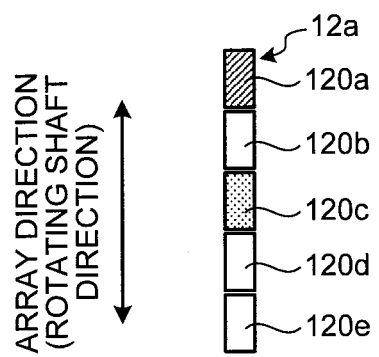

FIGS. 10A to 100 are explanatory diagrams of a case in which the inclination angle is −90 degrees. As depicted in FIGS. 10A to 10C, when the inclination angle of the case member 10 with respect to the horizontal plane is −90 degrees, the imaging element group 12a further moves counterclockwise on the basis of the vertical plane with respect to the horizontal as compared with the case where the inclination angle of the case member 10 with respect to the horizontal plane is −45 degrees. The diagonal line "d" in the linear imaging area is imaged by the imaging element 120a located at a position displaced by two imaging elements from the imaging element 120c at the center of the array direction. The non-formed area "ap" in the linear imaging area is imaged by the imaging elements 120b, 120c, 120d, and 120e. The line data becomes, for example, "01111" from output signals from the imaging elements 120a, 120b, 120c, 120d, and 120e.

Figure 11:
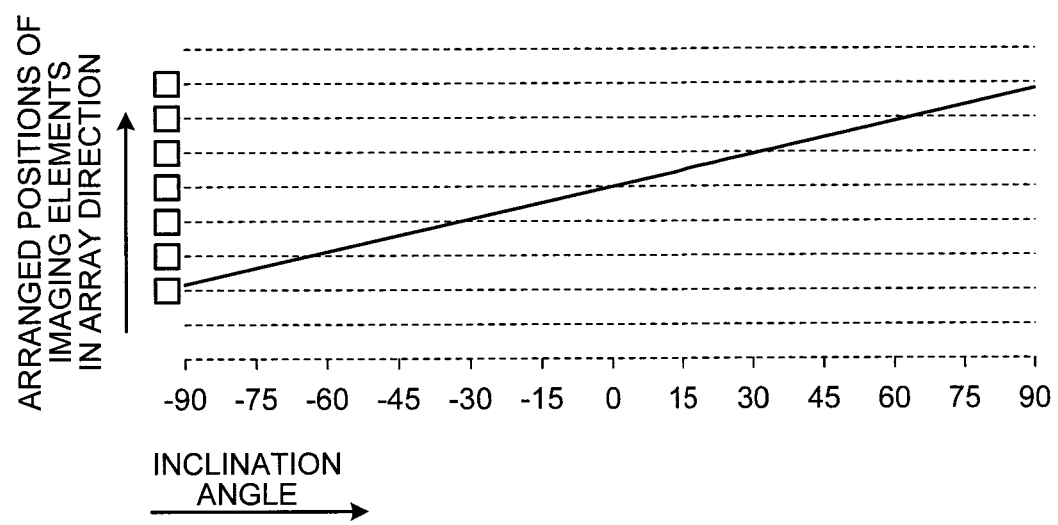
FIG. 11 is a graph representing a relationship between arranged positions of imaging elements in the array direction and inclination angles.

FIG. 11 is a graph representing a relationship between arranged positions of the imaging elements in the array direction and inclination angles. As depicted in FIG. 11, the positions of the imaging elements 120 that each detect the diagonal line "d" are plotted to draw a graph based on the output signals from the imaging elements 120 in association with changes in the inclination angles of the case member 10 with respect to the horizontal plane from −90 degrees to 90 degrees. The drawn graph is a straight line with a slope. More specifically, the angle detection device 1 is able to output a signal corresponding to an inclination angle of the case member 10 with respect to the horizontal plane. That is, the angle detection device 1 is able to detect the inclination angle of the case member 10 with respect to the horizontal plane.

The angle detection device 1 according to the first embodiment has been explained so far, however, the position of the center of gravity of the horizontal axis rotator 11 may not be located at the arm portion 111. For example, the position of the center of gravity of the horizontal axis rotator 11 may be located on the diagonal-line formed portion 110. In this case, the imaging sensor 12 simply changes the fixed position to the case member 10 according to the posture of the horizontal axis rotator 11 while the case member is kept in the horizontal plane. More specifically, the imaging element group 12a of the imaging sensor 12 simply faces the outer circumferential surface "s" of the diagonal-line formed portion 110 and is arranged on the same plane as the rotating shaft 11a and the center point of the diagonal line "d" while the case member is kept in the horizontal plane.

When the diagonal line "d" is detected by the imaging elements 120 arranged successively in the width direction, picked up image signals output from the successive imaging elements 120 become intermediate values each between a detected value and a non-detected value. The detected value mentioned here represents a value of an imaged signal when the imaging element 120 singly detects the diagonal line d, and the non-detected value is a value of a picked-up image signal when the imaging element 120 does not detect the diagonal line "d". These intermediate values are corrected by the image processing device 1a and all the corrected values are considered as detected values, and the detection-result output destination 1b determines an average value of inclination angles when each of the imaging elements 120 that output the intermediate values singly detects the diagonal line "d" and considers the average value as an actual inclination angle.

An image reading apparatus according to a second embodiment will be explained below. FIG. 12 is a side view of an outline of the image reading apparatus according to the second embodiment. An image reading apparatus 2 picks up an image of a sheet-like medium "P" while conveying the sheet-like medium "P". Hereinafter, the sheet-like medium "P" is simply called "medium P". The image reading apparatus 2 includes the angle detection device 1, a conveying roller 20, an imaging unit 21, a calibration sheet 22, and a control device 23.

In the second embodiment, the case member 10 of the angle detection device 1 is an apparatus body 24 of the image reading apparatus 2. The apparatus body 24 houses components provided in the image reading apparatus 2, such as the conveying roller 20, the imaging unit 21, the control device 23, and the calibration sheet 22 in the second embodiment.

The conveying roller 20 conveys the medium "P". The conveying roller 20 includes a paper feed roller 201 being a roller pair, and a paper ejection roller 202 being a roller pair in the second embodiment.

The paper feed roller 201 is the conveying roller 20 disposed most upstream in a conveying direction, and conveys the medium "P" inserted from a paper feed tray 2a into the apparatus body 24 to a position where the medium p is imaged by the imaging unit 21. The conveying direction mentioned here is a direction of conveying the medium "P". Hereinafter, the position where the medium "P" is imaged by the imaging unit 21 is simply called "imaging position". In the second embodiment, the paper feed roller 201 is a roller pair that includes a drive roller 201a with a rotation axis disposed lower than a conveyance path, and a driven roller 201b with a rotation axis disposed upper than the conveyance path. In the second embodiment, the driven roller 201b is opposed to the drive roller 201a across the conveyance path and is disposed so that it is able to contact the drive roller 201a.

In the second embodiment, the driven roller 201b is supported so as to be pressed against the plane of paper of the medium "P" entering a space between the drive roller 201a and the driven roller 201b. In the second embodiment, when the medium "P" does not enter the space between the drive roller 201a and the driven roller 201b, the outer circumferential surface of the driven roller 201b is in contact with the outer circumferential surface of the drive roller 201a. The drive roller 201a comes in contact with the medium "P" having entered the space between the driven roller 201b and the drive roller 201a, and conveys the medium "P" in the conveying direction through rotation of the drive roller 201a by a drive system explained later.

The paper ejection roller 202 is the conveying roller 20 disposed most downstream in the conveying direction, and ejects the medium "P" imaged by the imaging unit 21 from the apparatus body 24 to a paper ejection tray 2b or to the outside. The paper ejection roller 202 is a roller pair that includes, in the second embodiment, a drive roller 202a with a rotation axis disposed lower than the conveyance path and a driven roller 202b with a rotation axis disposed upper than the conveyance path. A relationship between the drive roller 202a and the driven roller 202b is the same as the relationship between the drive roller 201a and the driven roller 201b, and thus explanation thereof is omitted.

The drive roller 201a and the drive roller 202a are rotated by the drive system (not illustrated). The drive system is provided with, for example, a drive motor and a driving-force transmission device. The drive motor is, for example, a stepping motor. The drive motor is driven by power supplied from the control device 23. For example, the drive motor is driven by a pulse signal sent from the control device 23. This allows the drive motor to rotate (clockwise in FIG. 12) the drive roller 201a and the drive roller 202a through the driving-force transmission device.

In the second embodiment, an interval between the arranged paper feed roller 201 and paper ejection roller 202 is a distance over which a leading end of the medium "P" sent by the paper feed roller 201 in the conveying direction is able to infallibly reach the paper ejection roller 202, that is, a distance over which the medium "P" is infallibly transferable between the paper feed roller 201 and the paper ejection roller 202.

The conveying rollers 20 as explained above, that is, the paper feed roller 201 and the paper ejection roller 202, are driven, through the driving-force transmission device, by supply of power to the drive motor by the control device 23.

The imaging unit 21 is the imaging device. The imaging unit 21 picks up an image of the medium "P" conveyed by the conveying roller 20. In the second embodiment, the imaging unit 21 is disposed between the paper feed roller 201 and the paper ejection roller 202 in the conveying direction. In the second embodiment, one imaging unit 21 is disposed opposite to the side on which the drive roller 201a and the drive roller 202a are disposed with respect to the conveyance path, or upper than the conveyance path, and the imaging unit 21 faces the conveyance path. One imaging unit 21 may be disposed on the upper side and another imaging unit 21 on the lower side with respect to the conveyance path, so that images on both sides of the medium "P" are able to be picked up.

The imaging unit 21 includes a light source 211 and an imaging sensor 212.

The light source 211 is disposed, for example, near the imaging sensor 212 in the conveying direction, and is disposed in the upstream side of the imaging sensor 212 in the second embodiment. The light source 211 is, for example, an LED, which diffuses an emitted light by a light guide plate (not illustrated) and emits a linear light toward the medium "P" conveyed by the conveying roller 20 in the main scanning direction, and turns on according to a light turn-on instruction received from the control device 23.

The imaging sensor 212 includes a plurality of imaging elements. In the second embodiment, the imaging sensor 212 includes, for example, a plurality of CODs (charge coupled devices). In addition, the imaging sensor 212 may include, for example, a plurality of CMOS-type imaging elements. The imaging elements provided in the imaging sensor 212 are arrayed in a line along the main scanning direction. In the imaging sensor 212, a width formed of a plurality of imaging elements in the main scanning direction is set to a width larger than a sum of a width of the diagonal-line formed portion 110 of the angle detection device 1 in the main scanning direction and a width of the calibration sheet 22 explained later in the main scanning direction. The imaging sensor 212 is disposed on an optical axis of a reflected light being a light emitted from the light source 211 and reflected by the outer circumferential surface "s" of the diagonal-line formed portion 110, the calibration sheet 22, or by the medium "P" conveyed by the conveying roller 20. The medium "P" is conveyed by the conveying roller 20 in the conveying direction while the light source 211 is on, so that the imaging sensor 212 scans a read area being an area including all the area of the medium "P". Therefore, when the medium "P" is conveyed by the conveying roller 20 toward the imaging position in the conveying direction, or during scanning of the medium "P", the reflected light being the light emitted from the light source 211 and reflected by the outer circumferential surface "s" of the diagonal-line formed portion 110, the calibration sheet 22, or by the medium "P" is incident on the imaging elements of the imaging sensor 212. Thus, a picked-up image signal for each exposure corresponding to the read area is output from each of the imaging elements of the imaging sensor 212. The imaging sensor 212 generates line data per main scanning direction from the picked up image signal for each exposure output from each of the imaging elements, and outputs the generated line data.

As explained above, the imaging sensor 212 picks up an image of the medium "P" based on the reflected light reflected from the medium "P" conveyed by the conveying roller 20 toward the imaging position. The imaging sensor 212 picks up an image of the medium "P" according to an imaging instruction from the control device 23.

The calibration sheet 22 updates a correction reference value that becomes a reference when a picked-up image by the imaging unit 21 is corrected. The picked-up image is an image including at least a medium-picked-up image of the medium "P" conveyed by the conveying roller 20. In the second embodiment, the calibration sheet 22 updates reference data that becomes a reference when imaged image data is corrected. The picked-up image data mentioned here is data including at least medium-image data corresponding to the medium-picked-up image of the medium "P" conveyed by the conveying roller 20. The reference data mentioned here specifically represents white reference data and black reference data, each of which is data with correction reference values collected for each of the imaging elements of the imaging sensor 212.

The calibration sheet 22 is disposed between the drive roller 201a and the drive roller 202a in the conveying direction. The calibration sheet 22 is opposed to the imaging unit 21 across the conveyance path, and is disposed on the optical axis of the light emitted from the light source 211 of the imaging unit 21. The calibration sheet 22 is supported by the apparatus body 24 of the image reading apparatus 2 in the second embodiment. The width of the calibration sheet 22 in the main scanning direction is set to a width larger than the width of a medium "P" which is largest in the main scanning direction among mediums "P" capable of being scanned by the image reading apparatus 2. Therefore, when the medium "P" is scanned by the imaging unit 21, a part of the calibration sheet 22 is scanned together with the medium "P".

Figure 13A:
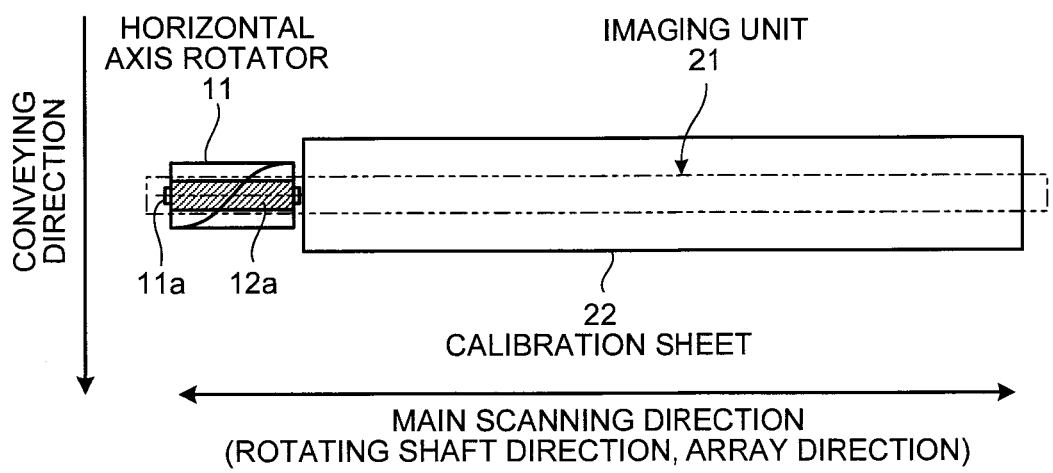
FIGS. 13A and 13B are diagrams representing a schematic positional relationship among an imaging unit, a calibration sheet, and a horizontal axis rotator.
Figure 13B:
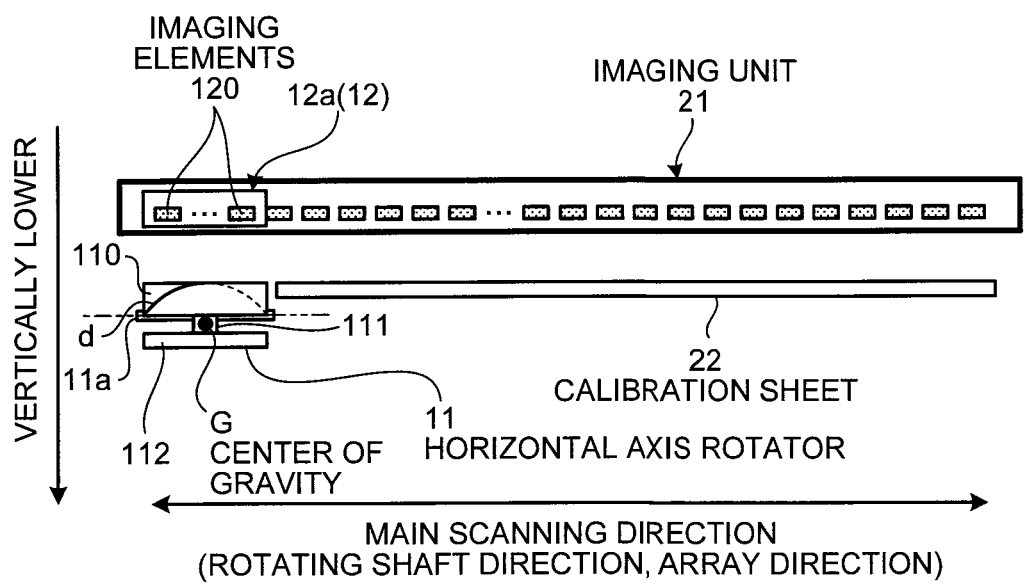

FIGS. 13A and 13B are diagrams representing a schematic positional relationship among the imaging unit, the calibration sheet, and the horizontal axis rotator. FIG. 13A is a top view schematically illustrating the positional relationship among the imaging unit 21, the calibration sheet 22, and the horizontal axis rotator 11. FIG. 13B is a front view when a schematic positional relationship among the imaging unit 21, the calibration sheet 22, and the horizontal axis rotator 11 is viewed along the conveying direction. As depicted in FIGS. 13A and 13B, the calibration sheet 22 is a rectangular sheet, its longitudinal direction is set to the main scanning direction, and its sheet face is disposed oppositely to the imaging sensor 212 of the imaging unit 21.

In the angle detection device 1, the rotating shaft 11a of the horizontal axis rotator 11 is provided parallel to the horizontal plane of the apparatus body 24 and is disposed in the main scanning direction being a direction orthogonal to the conveying direction. The rotating shaft 11a is supported by the apparatus body 24. The angle detection device 1 is disposed successively to the calibration sheet 22 in the main scanning direction.

In the second embodiment, the horizontal axis rotator 11 of the angle detection device 1 and the imaging sensor 12 are disposed successively to the calibration sheet 22 in the main scanning direction. In the second embodiment, the horizontal axis rotator 11 is disposed on the lower side with respect to the conveyance path.

The imaging unit 21, the calibration sheet 22, and the horizontal axis rotator 11 have the positional relationship as explained above, and the imaging elements of the imaging sensor 212 are located on the vertical plane with respect to the horizontal. In the second embodiment, the imaging element group 12a of the angle detection device 1 is a part of the imaging elements provided in the imaging sensor 212 of the imaging unit 21. The imaging elements 120 of the imaging element group 12a are those opposed to the outer circumferential surface "s" of the diagonal-line formed portion 110, among the imaging elements provided in the imaging sensor 12. For example, when the imaging elements provided in the imaging sensor 212 of the imaging unit 21 are arrayed in three lines along the main scanning direction, the imaging elements 120 of the imaging element group 12a are arrayed in three lines along the main scanning direction. For example, when the imaging elements provided in the imaging sensor 212 of the imaging unit 21 are arrayed in a line along the main scanning direction, the imaging elements 120 of the imaging element group 12a are arrayed in a line along the main scanning direction.

The control device 23 controls the conveying roller 20 and the imaging unit 21.

Next, the operation of the image reading apparatus 2 according to the second embodiment will be explained below.

The control device 23 is characterized by change of a physical quantity related to conveyance of the medium "P" by the conveying roller 20 based on the detection result of the angle detection device 1. In the second embodiment, the physical quantity related to conveyance of the medium "P" by the conveying roller 20 is a sending force being a force of sending the medium "P" toward the conveying direction by the conveying roller 20.

Figure 14:
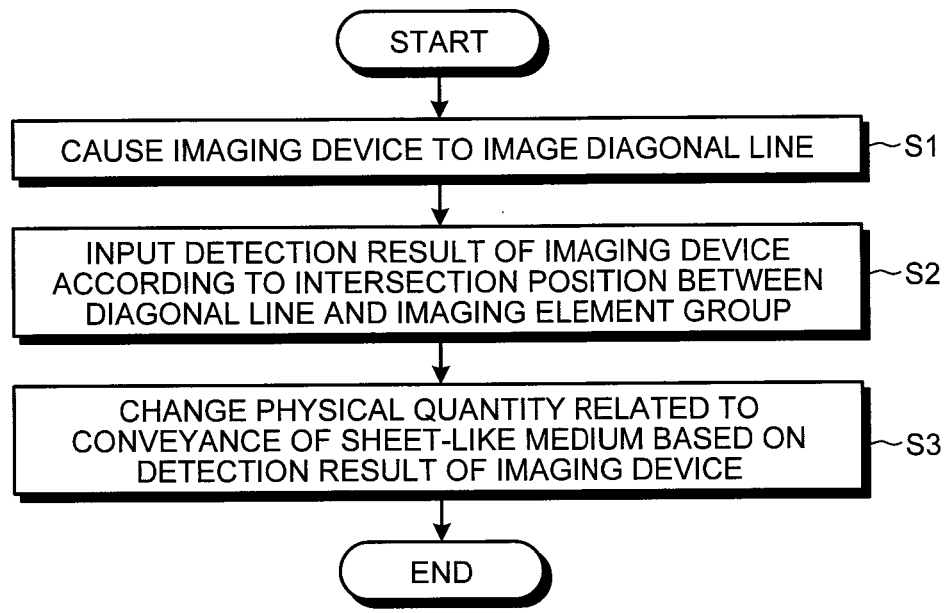
FIG. 14 is a flowchart of a schematic operational procedure of the image reading apparatus.

FIG. 14 is a flowchart of a schematic operational procedure of the image reading apparatus. As depicted in FIG. 14, first, the control device 23, when the power of the image reading apparatus 2 is switched from off to on, causes the imaging device to pick up an image of the diagonal line "d" upon scanning (Step S1). More specifically, the control device 23 causes the light source 211 and the imaging element group 12a of the imaging unit 21 to pick up an image of the diagonal line "d" upon pre-pull-in control or simultaneously with starting of scanning. The pre-pull-in control here refers to causing the drive roller 201a and the driven roller 201b to hold the leading end of the medium "P" inserted into the apparatus body 24 in the conveying direction by supplying of power by the control device 23 to the drive motor to rotate the drive roller 201a, when the power of the image reading apparatus 2 has switched from off to on and it has been determined, based on the detection result of a medium detection sensor (not illustrated), that the medium "P" was inserted into the apparatus body 24 before a Scan button (not illustrated) was pressed. Next, the control device 23 inputs the detection result of the imaging device according to an intersection position between the diagonal line "d" and the imaging element group 12a (Step S2). More specifically, the control device 23 inputs the detection result of the imaging element group 12a of the imaging unit 21 according to the intersection position between the diagonal line "d" and the imaging element group 12a. Next, the control device 23 changes the physical quantity related to the conveyance of the medium "P" based on the detection result of the imaging device (Step S3). More specifically, the control device 23 changes the physical quantity related to the conveyance of the medium "P" or, in the second embodiment, changes the sending force being the force of sending the medium "P" toward the conveying direction by the conveying roller 20 based on the detection result of the imaging element group 12a of the imaging unit 21. To be more specific, the control device 23 decreases the sending force of the medium "P" by the conveying roller 20 with an increase in an inclination-angle change amount being a change amount of an inclination angle of the apparatus body 24 of the image reading apparatus 2 with respect to the horizontal plane based on the detection result of the angle detection device 1 or based on the detection result of the imaging element group 12a. Then, when changing the physical quantity related to the conveyance of the medium "P" based on the detection result of the imaging device, the control device 23 maintains the physical quantity related to the conveyance of the medium "P" to the physical quantity changed at Step S3 until a change appears in the detection result of the angle detection device 1 (End).

Next, a specific operation of the image reading apparatus 2 will be explained below.

Figure 15:
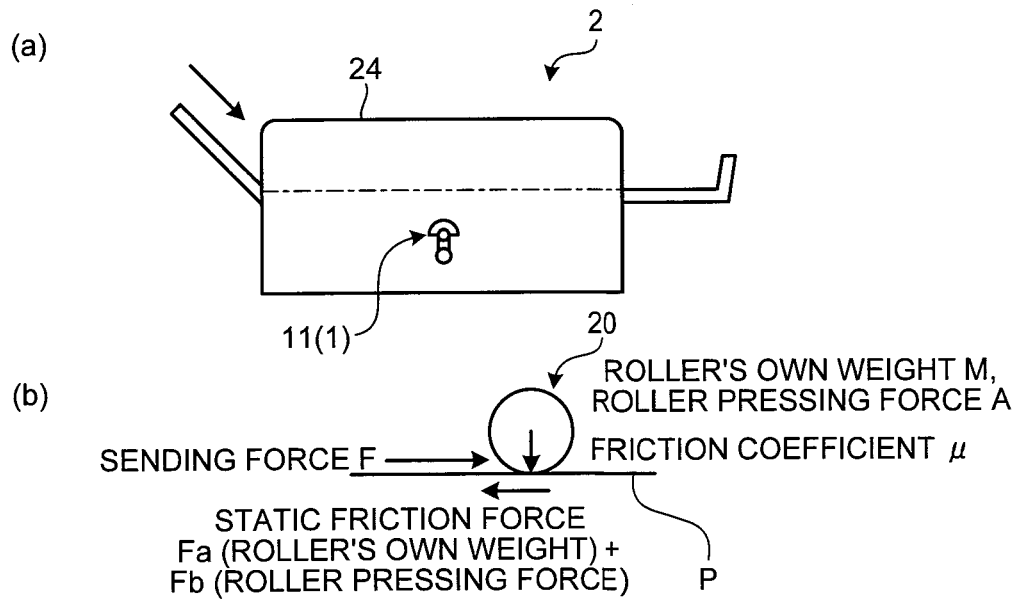
FIG. 15 is an explanatory diagram of the case in which the inclination angle is 0 degree.

FIG. 15 is an explanatory diagram of the case in which the inclination angle is 0 degree. Hereinafter, in the second embodiment, an inclination angle of the apparatus body 24 with respect to the horizontal plane is a positive angle when the apparatus body 24 rotates clockwise on the plane of paper, and is a negative angle when the apparatus body 24 rotates counterclockwise on the plane of paper. As depicted in (a) of FIG. 15, when the inclination angle of the apparatus body 24 with respect to the horizontal plane is 0 degree, as explained in the first embodiment, the line data output from the imaging element group 12a becomes, for example, "11011". As depicted in (b) of FIG. 15, a sending force "F" regarded as being the minimum required to convey the medium "P" by the conveying roller 20 toward the conveying direction is expressed by:

$$F=Fa+Fb \text{(where } Fa=\mu M \cos 0°, Fb=A)$$

"Fa" is obtained by multiplying a drag of a vertical component of an own weight M of the conveying roller 20 by a friction coefficient $\mu$, and is a static friction force acting between the conveying roller 20 and the medium "P". The vertical direction mentioned here is a vertical direction with respect to a face of the medium "P" in contact with the conveying roller. "Fb" is a pressing force "A" applied to the medium "P" by the conveying roller 20.

Figure 16:
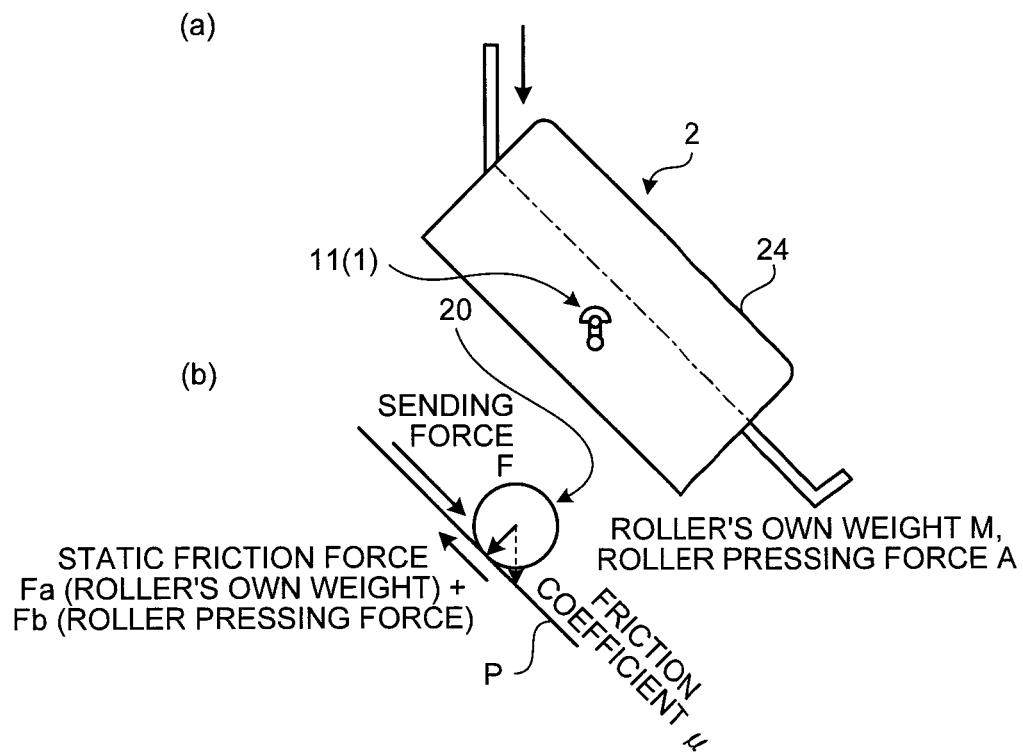
FIG. 16 is an explanatory diagram of the case in which the inclination angle is 45 degrees.

FIG. 16 is an explanatory diagram of the case in which the inclination angle is 45 degrees. As depicted in (a) of FIG. 16, when the inclination angle of the apparatus body 24 with respect to the horizontal plane is 45 degrees, as explained in the first embodiment, the line data output from the imaging element group 12a becomes, for example, "11101". As depicted in (b) of FIG. 16, the sending force "F" regarded as being the minimum required to convey the medium p by the conveying roller 20 toward the conveying direction is expressed by:

$F=Fa+Fb$ (where $Fa=\mu M \cos 45°, Fb=A$)

Figure 17:
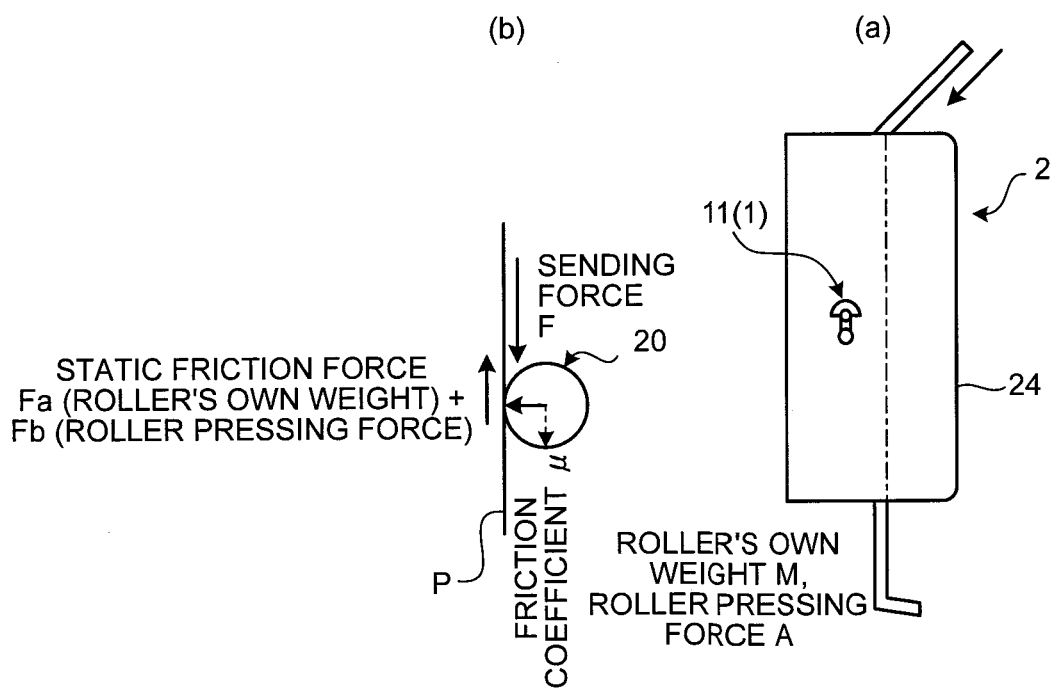
FIG. 17 is an explanatory diagram of the case in which the inclination angle is 90 degrees.

FIG. 17 is an explanatory diagram of the case in which the inclination angle is 90 degrees. As depicted in (a) of FIG. 17, when the inclination angle of the apparatus body 24 with respect to the horizontal plane is 90 degrees, as explained in the first embodiment, the line data output from the imaging element group 12a becomes, for example, "11110". As depicted in (b) of FIG. 17, the sending force "F" regarded as being the minimum required to convey the medium "P" by the conveying roller 20 toward the conveying direction is expressed by:

$F=Fa+Fb$ (where $Fa=\mu M \cos 90°, Fb=A$)

Figure 18:
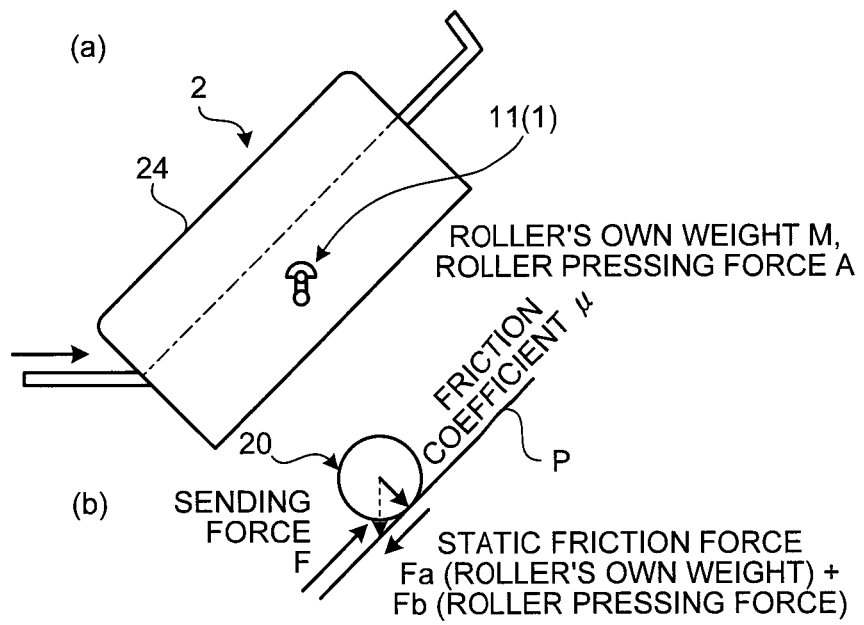
FIG. 18 is an explanatory diagram of the case in which the inclination angle is −45 degrees.

FIG. 18 is an explanatory diagram of the case in which the inclination angle is −45 degrees. As depicted in (a) of FIG. 18, when the inclination angle of the apparatus body 24 with respect to the horizontal plane is −45 degrees, as explained in the first embodiment, the line data output from the imaging element group 12a becomes, for example, "10111". As depicted in (b) of FIG. 18, the sending force "F" regarded as being the minimum required to convey the medium "P" by the conveying roller 20 toward the conveying direction is expressed by:

$F=Fa+Fb$ (where $Fa=\mu M \cos(-45°), Fb=A$)

Figure 19:
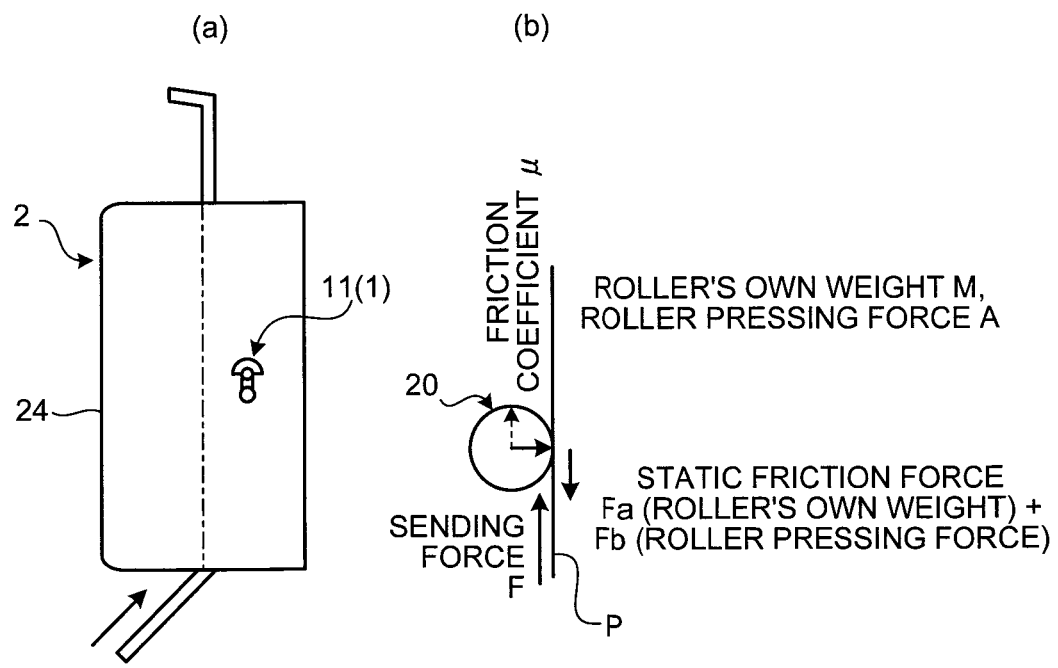
FIG. 19 is an explanatory diagram of the case in which the inclination angle is −90 degrees.

FIG. 19 is an explanatory diagram of the case in which the inclination angle is −90 degrees. As depicted in (a) of FIG. 19, when the inclination angle of the apparatus body 24 with respect to the horizontal plane is −90 degrees, the line data output from the imaging element group 12a becomes, for example, "01111". As depicted in (b) of FIG. 19, the sending force "F" regarded as being the minimum required to convey the medium "P" by the conveying roller 20 toward the conveying direction is expressed by:

$F=Fa+Fb$ (where $Fa=\mu M \cos(-90°), Fb=A$)

Figure 20:
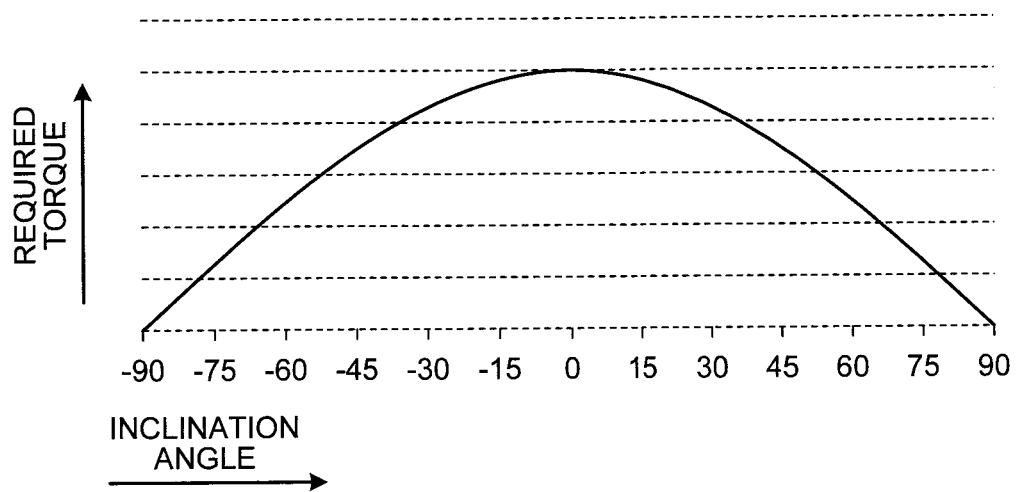
FIG. 20 is a graph representing a relationship between required torque of a drive motor and inclination angle.

FIG. 20 is a graph representing a relationship between required torque of a drive motor and inclination angle. If a change in a value of the sending force "F" being the minimum required to convey the medium "P" by the conveying roller 20 in the conveying direction in association with a change, from −90 degrees to 90 degrees, in the inclination angle of the apparatus body 24 with respect to the horizontal plane is plotted to draw a graph, the drawn graph becomes a cosine curve. More specifically, if the required torque of the drive motor is controlled according to the cosine curve in association with the change in the inclination angle of the apparatus body 24 with respect to the horizontal plane from −90 degrees to 90 degrees, the control device 23 is able to cause the sending force "F", being the minimum required to convey the medium "P" by the conveying roller 20 in the conveying direction, to act on the medium "P". Therefore, the control device 23 sets the required torque of the drive motor based on the line data output from the angle detection device 1, which allows the image reading apparatus 2 to change the sending force of the medium "P" by the conveying roller 20 to a magnitude being the minimum required to convey the medium "P" by the conveying roller 20 in the conveying direction, based on the inclination angle of the apparatus body 24 with respect to the horizontal plane.

Generally, when the inclination angle of the apparatus body 24 with respect to the horizontal plane is θ degrees, the sending force "F" being the minimum required to convey the medium p by the conveying roller 20 toward the conveying direction is expressed by:

$F=Fa+Fb$ (where $Fa=\mu M \cos\theta°, Fb=A$)

Here, three points of view of the following (1) to (3) are obtained.

(1) The sending force of the medium "P" by the conveying roller 20 includes a static friction force acting between the conveying roller 20 and the medium "P".

(2) The static friction force "Fa" increases with an increase in a drag of a vertical component M cos θ° of the own weight "M" of the conveying roller 20.

(3) The drag of the vertical component M cos θ° of the own weight "M" of the conveying roller 20 decreases with an increase in a change amount of the inclination angle θ° with respect to the horizontal plane in the conveying direction.

From the three viewpoints of (1) to (3), it is found that the sending force "F" being the minimum required to convey the medium "P" by the conveying roller 20 toward the conveying direction decreases with an increase in the change in the inclination angle of the apparatus body 24 of the image reading apparatus 2. Based on this finding, when the image reading apparatus 2 is used, the control device 23 decreases the sending force of the medium "P" by the conveying roller 20 if the change in the inclination-angle of the apparatus body 24 increases, based on the detection result of the imaging element group 12a of the angle detection device 1, and this enables the drive power of the conveying roller 20 to be saved.

Moreover, based on the finding, because when the image reading apparatus 2 is used, the control device 23 controls the conveying roller 20 based on the inclination angle of the apparatus body 24 with respect to the horizontal plane detected by the angle detection device 1, for example, conveyance of the medium "P" by the conveying roller 20 is facilitated.

As explained above, when the image reading apparatus 2 is used, the control device 23 decreases the sending force of the medium "P" by the conveying roller 20 when the inclination-angle change of the apparatus body 24 increases, based on the detection result of the imaging sensor 12 of the angle detection device 1, and this enables the drive power of the conveying roller 20 to be saved. Thus, power is not unnecessarily consumed by the drive motor driving the conveying roller 20. Because of this, there is no need to take new measures against heat and soundproofing measures in the image reading apparatus 2.

Furthermore, the imaging element group 12a provided in the imaging sensor 12 of the angle detection device 1 is a part of the imaging elements provided in the imaging sensor 212 of the imaging unit 21, and thus the imaging unit 21 picks up an image of the diagonal line "d" formed on the outer circumferential surface "s" of the horizontal axis rotator 11. Therefore, the angle detection device 1 is able to detect an inclination angle of the apparatus body 24 of the image reading apparatus 2 with respect to the horizontal plane based on the imaging result of the imaging sensor 212 of the imaging unit 21.

The image reading apparatus 2 according to the second embodiment has been explained. When the image reading apparatus 2 is not performing scanning, the control device 23 may cause the imaging unit 21 to pick up an image of the diagonal line "d" to detect an inclination angle of the apparatus body 24 with respect to the horizontal plane.

Furthermore, in the image reading apparatus 2, the control device 23 has been explained to set the required torque of the drive motor based on the line data output from the angle detection device 1. However, instead of the torque, the control device 23 may set a pressing force of the conveying roller 20 against the medium "P" based on the line data output from the angle detection device 1. In order to change the pressing force of the conveying roller 20 against the medium "P", it is only necessary to further provide a rotating-shaft position changing device in the image reading apparatus 2. The rotating-shaft position changing device mentioned here is a device that is able to change a distance between the conveyance path and the rotating shaft of the conveying roller 20 according to a rotating-shaft position changing signal received from the control device 23. In this manner, in the image reading apparatus 2, the control device 23 sets the pressing force of the conveying roller 20 against the medium "P" based on the line data output from the angle detection device 1, and thus it is possible to set the sending force of the medium "P" by the conveying roller 20 to a magnitude that is the minimum required to convey the medium "P" by the conveying roller 20 toward the conveying direction, based on the inclination angle of the apparatus body 24 with respect to the horizontal plane.

The image reading apparatus 2 according to the second embodiment is provided with the calibration sheet 22, but the image reading apparatus 2 may be provided with a backing portion instead of the calibration sheet 22. The backing portion is for making a margin image a fixed image in order to cut out a medium-imaged image from a picked-up image including the medium-picked-up image of the medium "P" conveyed by the conveying roller 20 and the margin image around the medium-picked-up image. The margin image is an image picked up by the imaging unit 21. More specifically, the backing portion is for making the margin image data a data of a collection of constant values to cut out medium image data, from the picked-up image data including the medium image data corresponding to the medium-picked-up image of the medium "P" conveyed by the conveying roller 20 and margin image data corresponding to the margin image around the medium-picked-up image. When the image reading apparatus 2 according to the second embodiment is provided with the backing portion, the imaging unit 21 includes a plurality of imaging elements arrayed along the main scanning direction so that a read width in the main scanning direction is wider than the width of the medium "P" as a read target in the main scanning direction. The backing portion is simply sheet-shaped or plate-shaped. In addition, conditions of the backing portion as follows are preferably the same as the calibration sheet 22: an arranged position of the backing portion, a width of the backing portion in the main scanning direction, a relationship between the light incident on and the light reflected by the backing portion, a positional relationship of the backing portion with respect to the imaging unit 21 and the horizontal axis rotator 11, and the like. More specifically, when the image reading apparatus 2 according to the second embodiment is provided with the backing portion, the angle detection device 1 is disposed successively to the backing portion in the main scanning direction, the rotating shaft direction is set parallel to the main scanning direction, and the imaging element group 12a of the angle detection device 1 is part of a plurality of imaging elements provided in the imaging sensor 212 of the imaging unit 21. Furthermore, in the image reading apparatus 2 according to the second embodiment, the calibration sheet 22 may have a function of the backing portion. Even in the above cases, the same effects as those of the image reading apparatus 2 according to the second embodiment are obtainable.

The image reading apparatus 2 according to the second embodiment has been explained as the angle detection device 1 of the first embodiment being applied thereto, but a conventionally known angle sensor such as a rotary encoder or a triaxial gyro sensor may be applied thereto instead. Here, if the triaxial gyro sensor is applied to the image reading apparatus 2, the image reading apparatus 2 is able to change the physical quantity related to the conveyance of the medium "P" by the conveying roller 20 based on inclination angles in various directions of the apparatus body 24 with respect to the horizontal plane.

As explained above, the angle detection device 1 is applied to the image reading apparatus 2, and this allows the image reading apparatus 2 to detect the inclination angle of the apparatus body 24 with respect to the horizontal plane.

According to an embodiment of the invention, the center of gravity of the horizontal axis rotator is always located in a vertically lower side of the rotating shaft, and even if the inclination angle of the case member with respect to the horizontal plane changes, the posture does not change. When the inclination angle of the case member with respect to the horizontal plane changes, the imaging sensor is inclined together with the case member while being kept opposed to the outer circumferential surface of the horizontal axis rotator. More specifically, when the inclination angle of the case member with respect to the horizontal plane changes, the imaging sensor rotates around the axis of the horizontal axis rotator by the same angle as the inclination angle of the case member with respect to the horizontal plane in a state in which the imaging sensor is opposed to the outer circumferential surface of the horizontal axis rotator when viewed from the rotation axis of the horizontal axis rotator. At this time, if the outer circumferential surface of the horizontal axis rotator is viewed from the imaging sensor toward the rotation axis of the horizontal axis rotator, an intersection position shifts along the array direction of a plurality of imaging elements according to the inclination angle of the case member with respect to the horizontal plane. This leads to a different output result of the imaging sensor according to the inclination angle of the case member with respect to the horizontal plane. Therefore, it is possible to detect an inclination angle of the case member with respect to the horizontal plane. As seen from the above, it is possible to detect an inclination angle of an object to be measured with respect to the horizontal plane with a new configuration.

Moreover, according to an embodiment of the invention, it is possible to apply the angle detection device to the image reading apparatus and this allows detection of an inclination angle of the apparatus body of the image reading apparatus with respect to the horizontal plane. Furthermore, according to an embodiment of the invention, when the image reading apparatus is used, the control device is able to change the physical quantity related to conveyance of a sheet-like medium by the conveying roller according to the inclination angle of the apparatus body with respect to the horizontal plane. More specifically, for example, when the image reading apparatus is used, the control device decreases the sending force of the sheet-like medium by the conveying roller with an increase in an inclination-angle change amount of the apparatus body, based on the detection result of the angle detection device. Therefore, when the image reading apparatus is used, the control device decreases the sending force of the sheet-like medium by the conveying roller based on the detection result of the angle detection device if the inclination-angle change amount of the apparatus body is increased, and this enables the drive power of the conveying roller to be saved. As explained above, it is possible to save the drive power of the conveying roller based on the detection result of the angle detection device.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An angle detection device, comprising:
    a horizontal axis rotator including:
        a rotating shaft supported by a case member inside the case member in a rotating shaft direction parallel to a horizontal plane of the case member;
        a center of gravity at a position different from a position of the rotating shaft; and
        a diagonal line formed on an outer circumferential surface of the horizontal axis rotator, the outer circumferential surface being a circumferential surface formed along a circumferential direction around a rotation axis of the horizontal axis rotator, the diagonal line intersecting with a width direction that is a direction orthogonal to the circumferential direction around the rotation axis if the outer circumferential surface is spread into a plane along the circumferential direction around the rotation axis; and
    an imaging sensor including an imaging element group that is a plurality of imaging elements arrayed in at least one line in an array direction that is a direction in which the plurality of imaging elements are arrayed, the array direction being parallel to the rotating shaft direction, the imaging sensor being fixed to the case member opposite to the outer circumferential surface inside the case member, wherein
    the imaging element group intersects with the diagonal line if the outer circumferential surface is viewed from the imaging sensor toward the rotating shaft, and
    an intersection position that is a position of the intersection changes according to rotation of the case member around the rotation axis when viewed from the rotating shaft.

2. An image reading apparatus, comprising:
    the angle detection device according to claim 1;
    a conveying roller that contacts a sheet-like medium and conveys the contacted medium in a conveying direction that is a direction in which the medium is conveyed;
    an imaging device that picks up an image of the conveyed medium; and
    a control device that controls the conveying roller and the imaging device, wherein
    the case member is an apparatus body that houses at least the conveying roller and the imaging device, and
    the control device changes a physical quantity related to conveyance of the medium by the conveying roller based on a detection result of the angle detection device.

3. The image reading apparatus according to claim 2, wherein
    the rotating shaft direction is a direction parallel to a horizontal plane of the apparatus body and orthogonal to the conveying direction,
    the physical quantity is a sending force that is a force for sending the medium in the conveying direction by the conveying roller, and
    the control device decreases the sending force for the medium by the conveying roller as an inclination-angle change that is a change in inclination angle of the apparatus body with respect to the horizontal plane increases, based on the detection result of the angle detection device.

4. The image reading apparatus according to claim 2, further comprising a calibration sheet that is arranged opposite to the imaging device and is for updating a correction reference value that becomes a reference upon correction of a picked-up image including at least a medium-picked-up image of the conveyed medium, wherein
    the angle detection device is arranged successively to the calibration sheet in a main scanning direction that is a direction orthogonal to the conveying direction,
    the rotating shaft direction is parallel to the main scanning direction,
    the imaging device includes a plurality of imaging elements arrayed along the main scanning direction, and
    the imaging element group is part of the plurality of imaging elements included in the imaging device.

5. The image reading apparatus according to claim 2, wherein
    the imaging device includes a plurality of imaging elements arrayed along a main scanning direction that is a direction orthogonal to the conveying direction so that a read width in the main scanning direction becomes wider than a width of the medium in the main scanning direction, the medium being a target to be read,
    the image reading apparatus further comprises a backing portion that is arranged opposite to the imaging device and is for making a margin image a fixed image for cutting out a medium-picked-up image of the conveyed medium from a picked-up image including the medium-picked-up image and the margin image around the medium-picked-up image,
    the angle detection device is arranged successively to the backing portion in the main scanning direction,
    the rotating shaft direction is parallel to the main scanning direction, and
    the imaging element group is part of the plurality of imaging elements included in the imaging device.

* * * * *